US005184269A

United States Patent [19]

Shimada et al.

[11] Patent Number: 5,184,269

[45] Date of Patent: Feb. 2, 1993

[54] OVERLOAD PROTECTIVE DEVICE

[75] Inventors: Toshio Shimada, Tochigi; Morio Kobayashi, Oyama; Takemi Tada; Shigeya Kawaminami, both of Tochigi, all of Japan

[73] Assignee: Hitachi, Ltd., Tokyo, Japan

[21] Appl. No.: 682,264

[22] Filed: Apr. 8, 1991

[30] Foreign Application Priority Data

| | | | |
|---|---|---|---|
| Apr. 6, 1990 | [JP] | Japan | 2-090324 |
| Aug. 6, 1990 | [JP] | Japan | 2-206758 |
| Aug. 29, 1990 | [JP] | Japan | 2-225051 |

[51] Int. Cl.$^5$ .......................... H02H 5/04; H02H 7/08

[52] U.S. Cl. .......................................... 361/24; 337/3

[58] Field of Search ........................ 361/24, 26, 32, 34, 361/124, 163; 337/3, 4, 5, 299, 304, 335

[56] References Cited

U.S. PATENT DOCUMENTS 2,727,962 12/1955 Vaughan .

3,959,691 5/1976 Clarke .................................. 361/24

4,885,560 12/1989 Niino ...................................... 337/3

FOREIGN PATENT DOCUMENTS 1-82424 3/1989 Japan .

1-279532 11/1989 Japan .

1-286220 11/1989 Japan .

3-20723 12/1990 Japan .

OTHER PUBLICATIONS

European Search Report EP 91 10 5246, dated Nov. 11, 1991 (4 pages).

Japanese Utility Model Unexamined Publication No. 59-72641, May 17, 1984.

Japanese Utility Model Unexamined Publication No. 64-35642, Mar. 3, 1989.

Japanese Utility Model Unexamined Publication No. 60-183349, Dec. 5, 1985.

Japanese Utility Model Unexamined Publication No. 63-174145, Nov. 11, 1988.

Japanese Patent Unexamined Publication No. 63-224125, Sep. 19, 1988.

Japanese Utility Model Unexamined Publication No. 64-1450, Jan. 6, 1989.

Japanese Utility Model Unexamined Publication No. 2-44232, Mar. 27, 1990.

*Primary Examiner*—R. Skudy

*Assistant Examiner*—Ed To

*Attorney, Agent, or Firm*—Antonelli, Terry, Stout & Kraus

[57] ABSTRACT

An overload protective device to the disposed in an electric circuit serving to supply current to a load has a pair of fixed contacts provided inside of a case and an inversible disk-like bimetal of a curved shape having a pair of movable contacts capable of coming in contact with the fixed contacts, respectively. A shaft is fixed to the case at one end thereof and formed with a head portion at the free end portion. The shaft extends though a hole formed in the central portion of the bimetal. When the bimetal breaks, a circuit breaker breaks the electric circuit permanently to thereby prevent the load and the overload protective device from being burnt out.

22 Claims, 20 Drawing Sheets

OVERLOAD PROTECTIVE DEVICE

FIELD OF THE INVENTION

The present invention relates to an overload protective device which is to be disposed in an electric circuit serving to supply current to a load such as a motor and which includes a bimetal.

DESCRIPTION OF THE PRIOR ART

It is general that a product using a motor, such as a refrigerator, an air conditioner or a humidity drier, is equipped with an overload protective device for the purpose of preventing superheating and burnout of the motor. An example of the conventional overload protective device is disclosed in Japanese Utility Model Unexamined Publication No.59-72641 or 64-35642. The overload protective device of this kind comprises a pair of fixed terminals each having a fixed contact inside of a case, a shaft extending in the case with one end thereof fixed to the case and the other end thereof constituting a free end formed with a head portion of a diameter greater than that of the shaft, an inversible disk bimetal of a curved shape having a hole formed in the central portion thereof into which the shaft is inserted and movable contacts capable of coming in contact with the fixed contacts respectively, an elastic device serving to press the bimetal against the head portion, and a heater wire electrically connected in series to the bimetal for serving to heat the same.

Further, there is known an overload protective device from which the heater wire is dispensed with as disclosed in Japanese Utility Model Unexamined Publication No. 60-183349.

These prior arts, however, are disadvantageous in that when the bimetal was caused to break, the movable contacts and fixed contacts were made to be welded to each other. Such welding results in an accident that a coil of the motor generates heat to burn out, and the temperature in the case of the overload protective device rises to burn out the case.

Heretofore, various means have been proposed for eliminating the above-described problems.

One of them is to use a heat-resistaing material such as ceramic for making the case as disclosed in Japanese Utility Model Unexamined Publication No. 59-72641.

On the other hand, Japanese Utility Model Unexamined Publication No. 63-174145 discloses a method that an operation counter board having a plurality of sawtooth-shaped projections is, equipped so that each time the bimetal makes a recovery motion, the bimetal engages with the sawtooth-shaped projections in order one by one to move the operation counter board downwards, and when the number of recovery motions made by the bimetal is equal to the number of sawtooth-shaped projections, the operation counter board comes in contact with the inner bottom surface of the case so as to restrain the bimetal from making the recovery motion. According to this means, even if the motor is not released from the abnormal state, the bimetal is restrained from making the recovery motion after making the definite number of recovery motions so that it is maintained in the inverted state, thereby cutting off the locked rotor current.

Further, Japanese Patent Unexamined Publication No. 63-224125 discloses a means that a first bimetal and a second bimetal the inversion temperature of which is higher than that of the first bimetal are connected in series so that when an abnormal current generates the first bimetal makes the inversion motion, and when the abnormal state is not cancelled to cause the first bimetal to repeat the inversion and recovery motions and break at last to thereby bring about the contact welding, the temperature rises abnormally so that the second bimetal makes the inversion motion to thereby cut off the abnormal current.

Moreover, Japanese Utility Model Unexamined Publication No. 64-1450 discloses a technique that a first bimetal is kept in contact at the lower surface thereof with a second bimetal so that when the first bimetal is caused to break to bring about the contact welding, the second bimetal makes the inversion motion so as to lift the first bimetal.

In addition, Japanese Utility Model Unexamined Publication No. 64-35642 or 2-44232 discloses a technique that a head portion of a shaft on which a bimetal is to be mounted is formed separately from the shaft and a depression is formed in the head portion so that when the shaft is fitted in the head portion a thermofusible metal is filled in the depression to bond the head portion to the shaft tip end. The bimetal is normally pressed against the head portion by the action of a spring, and however, as the bimetal is subjected to the contact welding to cause the temperature to rise, the thermofusible metal melts to release the bonding between the head portion and the shaft so that the bimetal and the head portion can be lifted by virtue of the biasing force of the spring.

There have been proposed various counter-measures for contact welding of the bimetal as described above, and however, they have the following problems respectively.

Namely, if the case is made of a ceramic material as disclosed in Japanese Utility Model Unexamined Publication No. 59-72641, although burnout of the case can be avoided without fail, the motor coil cannot be saved from burnout and the case will become expensive.

Further, in the prior art in which the operation counter board is equipped, as disclosed in Japanese Utility Model Unexamined Publication No. 63-171445, since the number of repetitions of the inversion and recovery motions of the bimetal is limited by the operation counter board, the following subjects are left to be solved in order to put this device into practice (1) In case of the overload protective device used in the refrigerator, air conditioner, dehumidifier or the like, it comes into action even due to motor compressor trouble, that is, due to trouble other than mechanical lock, so that the bimetal tends to be held in the inverted state by the operation counter board, resulting in an increase in necessary servicing.

(2) The operation counter board moves to change its position even due to trial operation for confirmation during the adjusting work, resulting in that the number of allowable operations left over is reduced.

Moreover, in case of using the first and second bimetals connected in series as disclosed in Japanese Patent Unexamined Publication No. 63-224125, since it is necessary to supply the current simultaneously to these bimetals, the following subjects are left to be solved in order to put this device into practice.

(1) The range of magnitude of the current which is permitted to flow is limited in accordance with the specific resistances of these bimetals.

(2) In case that the specific resistances of the bimetals are insufficient so that the heating values of the bimetals themselves are low, it is necessary to dispose a heater wire, and however, since it is necessary to keep an insulation gap between the bimetal and the heater wire, the space occupied by the heater wire is enlarged, resulting in that the overload protective device is increased in size.

(3) Since it is necessary to provide expensive contacts on each of the first and second bimetals, the device itself will become expensive.

In addition, in case of bonding the shaft to the head portion thereof using the thermofusible metal as disclosed in Japanese Utility Model Unexamined Publication No. 64-35642 or 2-44232, the following subjects are left to be solved in order to put this device into practice.

(1) As the bimetal is subjected to contact welding to make the temperature reach a high temperature, the thermofusible metal starts to melt to permit the bimetal and the head portion of the shaft to be lifted by the spring, and however, lifting of them is performed slowly owing to the viscosity of the thermofusible metal. As the lifting of the bimetal permits the movable contacts to separate from the fixed contacts on the inside bottom surface of the case, the electric circuit is cut out and, at the same time, the power source is lost, resulting in the thermofusible metal being solidified. Consequently, when the spring force does not act to sufficiently overcome the viscosity of the thermofusible metal, it is impossible, as described above, to keep a sufficient separation distance (contact gap) between the movable contacts and the fixed contacts when the bimetal is lifted.

(2) The above solidification phenomenon of thermofusible metal is the very resistance to the load of the spring, which resistance acts to reduce the force exerted by the spring to separate the contacts at the time of contact welding. It is expected that this fact becomes a hindrance in obtaining an overload protective device operative to open and close a load of large current.

(3) Since bonding by means of the thermofusible metal is accompanied with creep, it is necessary that there is a sufficient difference in temperature between the melting point of the metal and, the inversion temperature of the bimetal. Consequently, the temperature at which the contacts are caused to separate from each other is elevated so that the device can be used only in the limited range.

(4) In order to melt and charge the thermofusible metal into the depression of the head portion of the head portion of the shaft, an equipment of high stability is required additionally, resulting in that the cost of equipment is increased.

SUMMARY OF THE INVENTION

An object of the present invention is to provide an overload protective device of simple construction at a low cost which is capable of eliminating the abovedescribed problems and cutting out an electric circuit quickly and permanently at a definite operation temperature as well as maintaining high reliability under normal operating conditions.

The overload protective device according to the present invention is adapted to be used in an electric circuit serving to supply current to a load and comprises:

a case;

a pair of fixed terminals each having a fixed contact inside of the case;

a shaft extending in said case with one end thereof fixed to the case and the other end thereof constituting a free end formed with a head portion of a diameter greater than that of the shaft;

an inversible disk-like bimetal of a curved shape having formed in the central portion thereof a hole through which the shaft extends and movable contacts capable of coming in contact with the fixed contacts, respectively; and a circuit breaker serving to break the electric circuit permanently when the bimetal is caused to break, to prevent the load and the overload protective device from being burnt out.

In accordance with a first embodiment of the invention, there is provided an overload protective device adapted to be disposed in an electric circuit serving to supply current to a load, the device comprising:

a case;

a pair of fixed terminals each having a fixed contact inside of the case;

a shaft extending in the case with one end thereof fixed to the case and the other end thereof constituting a free end formed with a head portion of a diameter greater than that of the shaft;

an inversible disk-like bimetal of a curved shape having formed in the central portion thereof a hole through which the shaft extends and movable contacts capable of coming in contact with the fixed contacts respectively; and elastic means serving to press the bimetal against the head portion, wherein a thermoactive disk member of a curved shape is disposed between the head portion and said bimetal and movable in response to heat from a first position where the thermoactive member is in contact with the head portion at the peripheral edge portion thereof with the central portion thereof projecting against the bimetal to press the elastic means, to a second position where the central portion of the thermoactive member projects against the head portion to release the pressure of the elastic means, thereby breaking the electric circuit permanently.

In accordance with a second embodiment of the invention, there is provided an overload protective device to be disposed in an electric circuit serving to supply current to a load, the device comprising:

a case, a pair of fixed terminals each having a fixed contact inside of the case;

a shaft extending in the case with one end thereof fixed to the case and the other end thereof constituting a free end formed with a head portion of a diameter greater than that of the shaft;

an inversible disk-like bimetal of a curved shape having formed in the central portion thereof a hole through which the shaft extends and movable contacts capable of coming in contact with the fixed contacts respectively; and elastic means serving to press the bimetal against the head portion, wherein a coiled shape memory alloy member having memorized therein a close-contracted state in a high temperature range and a flat washer are disposed between the head portion and the bimetal, with the washer being disposed between the bimetal and one end of the coiled shape memory alloy member, and the coiled shape memory alloy member, being in contact at the other end thereof with the head portion.

In accordance with a third embodiment of the invention, there is provided an overload protective device to be disposed in an electric circuit serving to supply current to a load, the device comprising:

a case;

a pair of fixed terminals each having a fixed contact inside of the case;

a shaft extending in the case with one end thereof fixed to the case and the other end thereof constituting a free end formed with a head portion of a diameter greater than that of the shaft;

a first inversible disk-like bimetal of a curved shape having formed in the central portion thereof a hole through which the shaft extends and movable contacts capable of coming in contact with the fixed contacts, respectively; and elastic means serving to press the bimetal against the head portion, wherein a second bimetal and a washer are disposed between the head portion and the first bimetal, the second bimetal being a disk-like bimetal movable in response to heat from a first position where it is curved in the same direction as the first bimetal in its non-inverted position to a second position where the second bimetal is inverted in the reverse direction, and the washer comprises a disk washer curved in the opposite direction to the first bimetal in its non-inverted position and having a peripheral edge disposed in contact with the surface of the second bimetal and a central portion disposed in contact with the first bimetal.

In accordance with a fourth embodiment of the invention, there is provided an overload protective device to be disposed in an electric circuit serving to supply current to a motor, the device comprising:

a case;

a pair of fixed terminals each having a fixed contact inside of the case;

a shaft extending in the case with one end thereof fixed to the case and the other end thereof constituting a free end formed with a head portion of a diameter greater than that of the shaft;

an inversible disk-like bimetal of a curved shaped having formed in the central portion thereof a hole through which the shaft extends and movable contacts capable of coming in contact with the fixed contacts, respectively; and heating means electrically connected in series to the bimetal and disposed in the case in a position where the heating means is capable of heating the bimetal, the heating means comprising a material which is meltable within two seconds by a current of an ampere 1.35 to 1.85 times a rated starting ampere of the motor.

In accordance with a fifth embodiment of the invention, there is provided an overload protective device to be disposed in an electric circuit serving to supply current to a load, the device comprising:

a case;

a pair of fixed terminals each having a fixed contact inside of the case;

a shaft extending in the case with one end thereof fixed to the case;

a head portion welded to the other end of the shaft with a thermofusible metal and having a diameter greater than that of the shaft;

an inversible disk-like bimetal of a curved shape having formed in the central portion thereof a hole through which the shaft extends and movable contacts capable of coming in contact with the fixed contacts respectively; and elastic means serving to press the bimetal against the head portion, wherein the bimetal has a plurality of slits extending radially from the central hole and a stress concentrating portion disposed in at least one of positions located in a part of said plurality of slits and located on the extension of a part of the plurality of slits.

According to the first to third embodiments described above, excellent effects can be obtained as follows:

(1) When the bimetal is fatigued to break, the electric circuit is cut out permanently even if contact welding takes place, thereby making it possible to prevent the overload protective device, not to speak of the object of overload protection, from being burnt out.

(2) Before the bimetal is fatigued to break, when there is something wrong with the object of overload protection, the bimetal repeats the inversion and restoration motions without failing and, simultaneously with cancellation of abnormality, the bimetal closes the electric circuit without fail to bring the object of overload protection into the usable state, while the moment the bimetal breaks, a sufficient separation distance can be kept between the contacts. This contributes to remarkable improvement of the reliability.

(3) It is possible to perform the overload protection accurately and exactly irrespective of presence of the heater wire.

(4) It will do only to add a few parts such as bimetal and shape memory alloy member to the prior art device, so that it is possible to make the device small in size and light in weight while utilizing the parts of the prior art. Consequently, it is possible to manufacture the device at a low cost without sacrificing the inherent protection characteristic.

(5) It is possible to perform the function with high reliability to the loads of wide range from a small current one to a large current one, resulting in that the use of the device covers an extended range.

According to the fourth embodiment, in case that the contact welding takes place, when a large locked rotor current flows continuously to the motor to raise the temperature of the motor coil so that the insulation of the coil is locally deteriorated to cause the short-circuit current to flow intermittently, the heater wire melts at the time when the product of the short-circuit current flowing at this time and the short-circuit time reaches the self-heating energy (fusing energy) equivalent to the energy by which the heater wire melts within two seconds under the current of 1.35 to 1.85 times the rated starting current of the motor.

As a result, the current flow to the motor coil is interrupted so that it is possible to prevent the overload protective device, not to speak of the motor coil, from being burnt out.

According to the fifth embodiment, since a weak-point portion (stress concentrating portion) is formed in a portion of or around the circumference of the slits arranged radially, it is possible to control the breaking point of the bimetal in advance so as to be located at an ideal point.

As a result, the ability to cut out the electric circuit after the bimetal is fatigued to break and the contact welding takes place by causing the thermofusible metal to melt so as to permit the coil spring to lift the head portion of the adjust screw and the bimetal overcoming the contact welding force, is improved and stabilized so that it is possible to provide the overload protective device which is excellent in reliability and stability.

The above and other objects, features and advantages of the invention will be made more apparent by the following description with reference to the accompanying drawings.

DESCRIPTION OF PREFERRED EMBODIMENTS

Figure 1A:
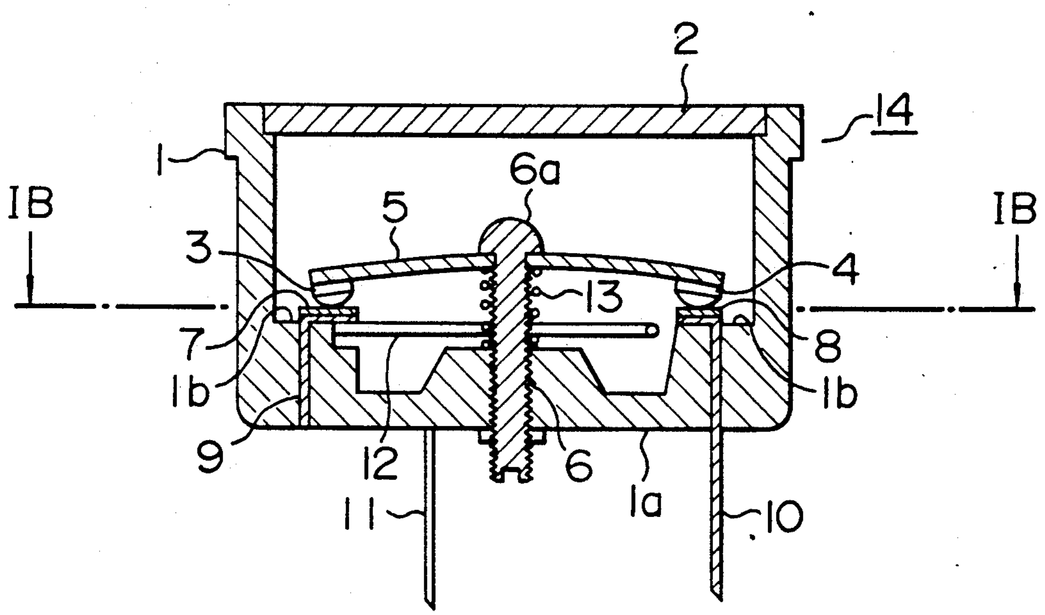
FIG. 1A PRIOR ART
FIG. 1A is an axial sectional view of a conventional overload protective device.

In the following description, the aforementioned prior arts will be described in more detail as well with the intention of promoting a better understanding on the present invention.

Further, in the following description, the same reference numerals are used to denote the same or equal component parts.

First, description will be given of a conventional overload protective device disclosed in the aforementioned Japanese Utility Model Unexamined Publication No. 59-72641, 64-35642 or the like with reference to FIGS. 1A and 1B. Reference numeral 1 denotes a case; 1*a* denotes an outside bottom surface; 1*b* denotes an inside bottom surface; 2 denotes a cover, 3, 4 denote movable contacts; 5 denotes a bimetal; 6 denotes a shaft; 6*a* denotes a head portion; 7, 8 denote fixed contacts, 9, 10 denote fixed terminals; 11 denotes a heater terminal; 12 denotes a heater wire, and 13 denotes a spring.

Figure 1B:
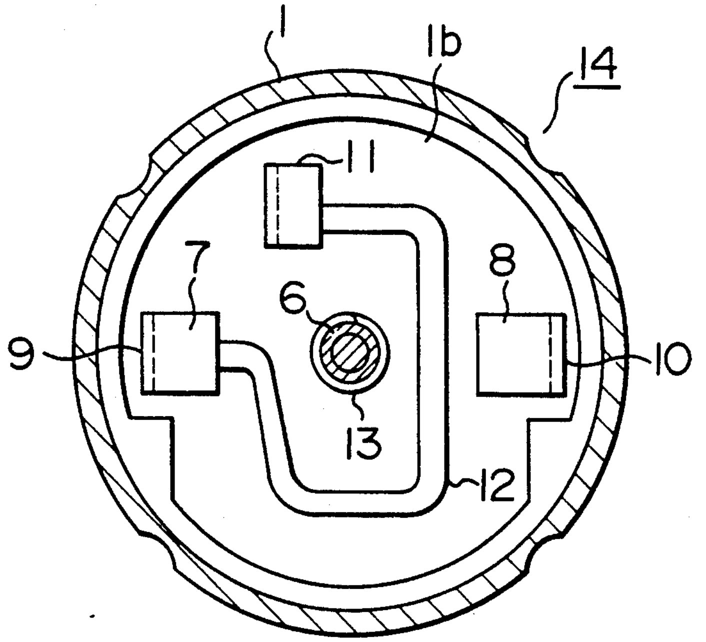
FIG. 1B PRIOR ART
FIG. 1B is a sectional view taken along the line 1B—1B of FIG. 1A.

Referring to FIGS. 1A and 1B, the case 1 is made of a heat-resisting insulating material such as phenolic plastic or unsaturated polyester resin, and has a bottomed cylindrical form. The cover 2 is put on the case 1 to define an interior space.

In the interior space thus defined, the shaft 6 made of brass is attached in the center of the bottom of the case 1 in such a manner as to pierce therethrough from the inside bottom surface 1*b* beyond the outside bottom surface 1*a*, and the head portion 6*a* is formed at one end of the shaft 6 located inside of the case 1. The bimetal 5 of disk form is mounted on the shaft 6 and, further, the spring 13 is mounted thereon as well between the bimetal 5 and the inside bottom surface 1*b* of the case 1, so that the bimetal 5 is pressed against the head portion 6*a* of the shaft 6 by a biasing force of the spring 13.

Two movable contacts 3, 4 are fixedly secured to side portions of one of surfaces of the bimetal 5 which faces to the inside bottom surface 1*b* of the case 1. Further, the fixed contact 7 at the tip end of the fixed terminal 9 which is fixed by piercing from the inside bottom surface 1*b* to the outside bottom surface 1*a* of the case 1 is fixedly secured to the inside bottom surface 1B at a position opposed to the movable contact 3, and the fixed contact 8 at the tip end of the fixed terminal 10 which is fixed in the same manner and a portion of which is projected to the outside is also fixedly secured to the inside bottom surface 1*b* at a position opposed to the movable contact 4. In addition, the heater terminal 11 is fixed to the bottom of the case 1 with a portion thereof projected to the outside likewise. The heater wire 12 is connected between the heater terminal 11 and the fixed terminal 9 by means of welding or the like. The fixed terminal 10 and the heater terminal 11 serves as external terminals of this type of overload protective device. The heater wire 12 is arranged closely to the lower surface of the bimetal 5 while going round the shaft 6 so that the bimetal 5 can be heated over the entire circumference thereof by heat generated from the heater wire 12.

The bimetal 5 has a shape that is curved centering around its central portions. When the temperature is low, the central portion of the bimetal 5 is curved to project upwards as shown in FIG. 1A so that the movable contacts 3, 4 are brought into contact with the fixed contacts 7, 8, respectively. This contributes to the formation of an electric circuit leading from the fixed terminal 10 to the heater terminal 11 via the fixed contact 8, the movable contact 4, the bimetal 5, the movable contact 3, the fixed contact 7, the fixed terminal 9 and the heater wire 12. As the temperature rises to reach a certain value, the bimetal 5 is suddenly changed into a shape that the central portion thereof is curved to project downwards inversely to the illustrated one. This is to be referred to as an inversion motion and the state of the bimetal 5 after inversion motion is to be referred to as the inverted state, hereinafter. Further, the temperature at which such inversion motion is caused to occur is to be referred to as the inversion temperature. As the bimetal 5 makes the inversion motion, the movable contacts 3, 4 are separated from the fixed contacts 7, 8, respectively, to thereby break the electric circuit.

Figure 2:
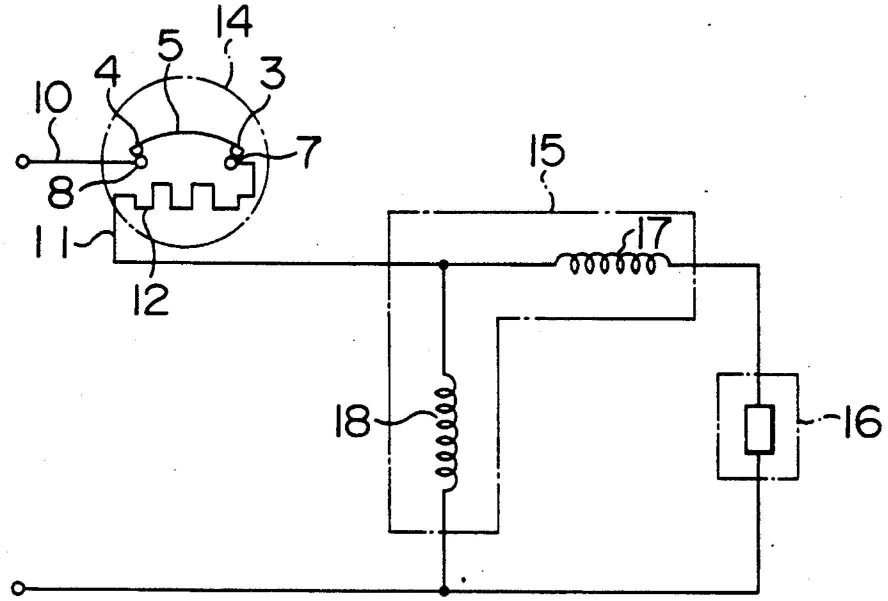
FIG. 2 PRIOR ART
FIG. 2 is a diagram of a connecting circuit which couples the overload protective device of FIG. 1A to a motor.

As the temperature decreases down to a certain value with the bimetal 5 held in the inverted state, the bimetal 5 recovers to the illustrated state. This is to be referred to as a recovery motion and the illustrated state is to be referred to as the original state, hereinafter. Further, the temperature at which the recovery motion is caused to occur is to be referred to as the recovery temperature. As the bimetal 5 recovers from the inverted state to the original state, the movable contacts 3, 4 are brought into contact with the fixed contacts 7, 8, respectively, to thereby make the electric circuit again. In FIG. 2, reference numeral 14 denotes an overload protective device; 15 denotes a motor; 16 denotes a starter; 17 denotes a starting coil, and 18 denotes a main coil. The same reference numerals are used to denote the corresponding portions to those of FIGS. 1A and 1B.

In FIG. 2, there are shown only the above-described circuit components of the overload protective device 14 and only the coils of the motor 15. In the motor 15, a series circuit of the starting coil 17 and the starter 16 is connected in parallel to the main coil 18. This motor 15 is connected in series to the overload protective device 14 by connecting one of terminals of the motor 15 to the heater terminal 11. Accordingly, the current flows to the starting coil 17 and the main coil 18 of the motor 15 through the fixed terminal 10, the bimetal 5, the heater wire 12 and the heater terminal 11 of the overload protective device 14.

When there is something wrong with the motor 15 to make a large locked rotor current flow thereto, self-heating of the bimetal 5 and the heater wire 12 is enhanced. Then, as soon as the temperature reaches the inversion temperature of the bimetal 5, the bimetal makes suddenly the inversion motion to make the movable contacts 3, 4 separate from the fixed contacts 7, 8 as described above, thereby interrupting the current flow to the motor 15. Upon this interruption of current flow, the bimetal 5 and the heater wire 12 begin to cool down. Then, as the temperature reaches the restoration temperature of the bimetal 5, the bimetal 5 makes abruptly the recovery motion so as to be restored to the original state, resulting in that the movable contacts 3, 4 are brought into contact with the fixed contacts 7, 8, respectively, to thereby start again the current supply to the motor 15.

In this case, if the motor 15 is released from the locked state, the bimetal 5 has no need to make again the inversion motion and the motor 15 can be operated under normal conditions.

Figure 3:
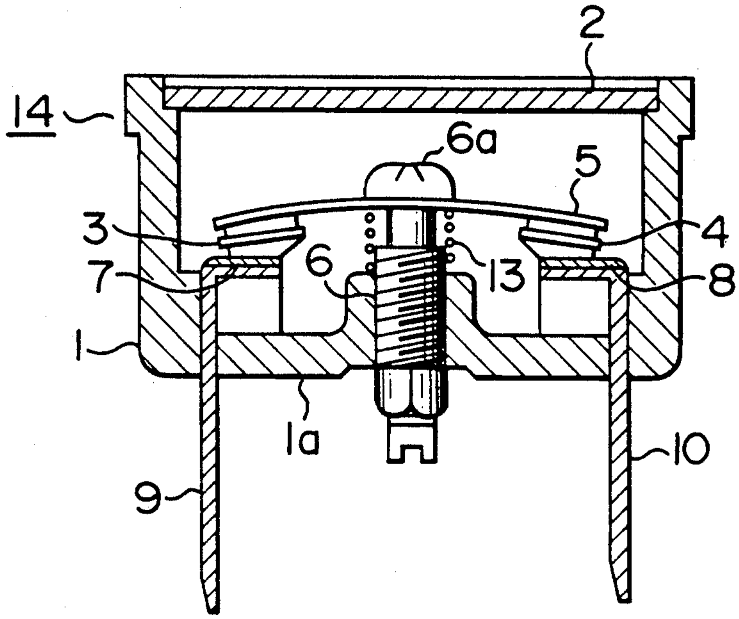
FIG. 3 PRIOR ART
FIG. 3 is an axial sectional view of another conventional overload protective device.

Secondary, description will be given of another conventional overload protective device disclosed in Japanese Utility Model Unexamined Publication No. 60-183349 and the like with reference to FIG. 3. In FIG. 3, the same reference numerals are used to denote the corresponding portions to those of FIG. 1A.

This conventional device basically differs from the conventional device shown in FIG. 1A in a point that no heater wire is provided. For this reason, the fixed terminal 9 having the fixed contact 7 secured at the tip end thereof is made to extend through the bottom of the case 1 to project to the outside as shown in FIG. 3 so as to serve as the external terminal together with the fixed terminal 10. When the movable contacts 3, 4 are kept in contact with the fixed contacts 7, 8, respectively, an electric circuit is formed leading from the fixed terminal 10 to the fixed terminal 9 via the fixed contact 8, the movable contact 4, the bimetal 5, the movable contact 3 and the fixed contact 7.

Figure 4:
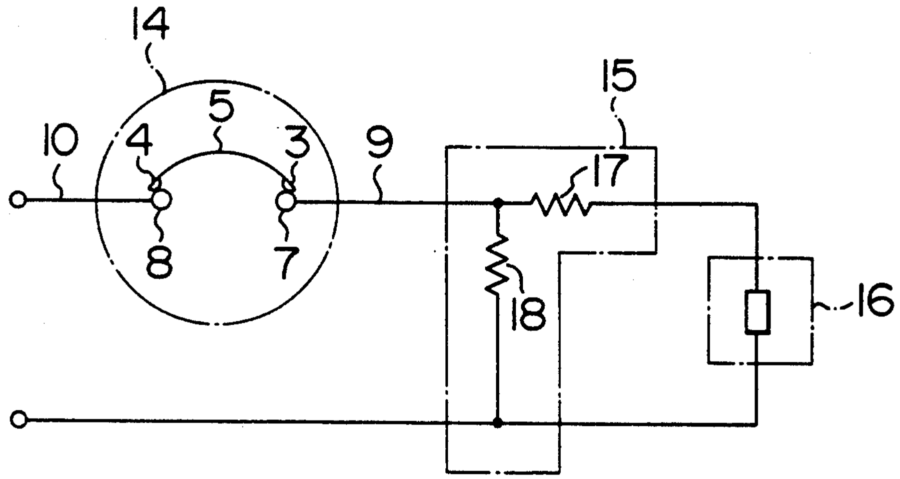
FIG. 4 PRIOR ART
FIG. 4 is a diagram of a connecting circuit which couples the overload protective device of FIG. 3 to a motor.

In case of using this type of overload protective device 14 in the motor 15, one fixed terminal 9 of the overload protective device 14 is connected to one of the terminals of the motor 15 as shown in FIG. 4.

When there is something wrong with the motor 15 to make a large locked rotor current flow thereto, the self-heating of the bimetal 15 is enhanced. Then, as soon as the temperature reaches the inversion temperature of the bimetal 5, the bimetal makes suddenly the inversion motion to make the movable contacts 3, 4 separate from the fixed contacts 7, 8, thereby interrupting the current flow to the motor 15. Upon this interruption of current flow, the bimetal 5 begins to cool down. Then, as the temperature reaches the recovery temperature of the bimetal 5, the bimetal 5 makes abruptly the recovery motion so as to be restored to the original state, resulting in that the movable contacts 3, 4 are brought into contact with the fixed contacts 7, 8, respectively, to thereby start again the current supply to the motor 15.

In this case, if the motor 15 is released from the locked state, the bimetal 5 has no need to make again in the inversion motion and the motor 15 can be operated under normal conditions.

As described above, according to the described conventional device, the motor 15 can be operated under normal conditions while being prevented from superheating and burning on condition that it is released from the locked state while the bimetal 5 is in the inverted state.

However, since the motor 15 is not freed from the abnormality, it is brought into the locked state again even though the bimetal 5 is restored to the original state due to its recovery motion, with the result that a large locked rotor current flows to the overload protective device 14. This causes the bimetal 5 to be brought into the inverted state due to the inversion motion thereof, resulting in the interruption of the current flow to the motor 15.

Figure 5:
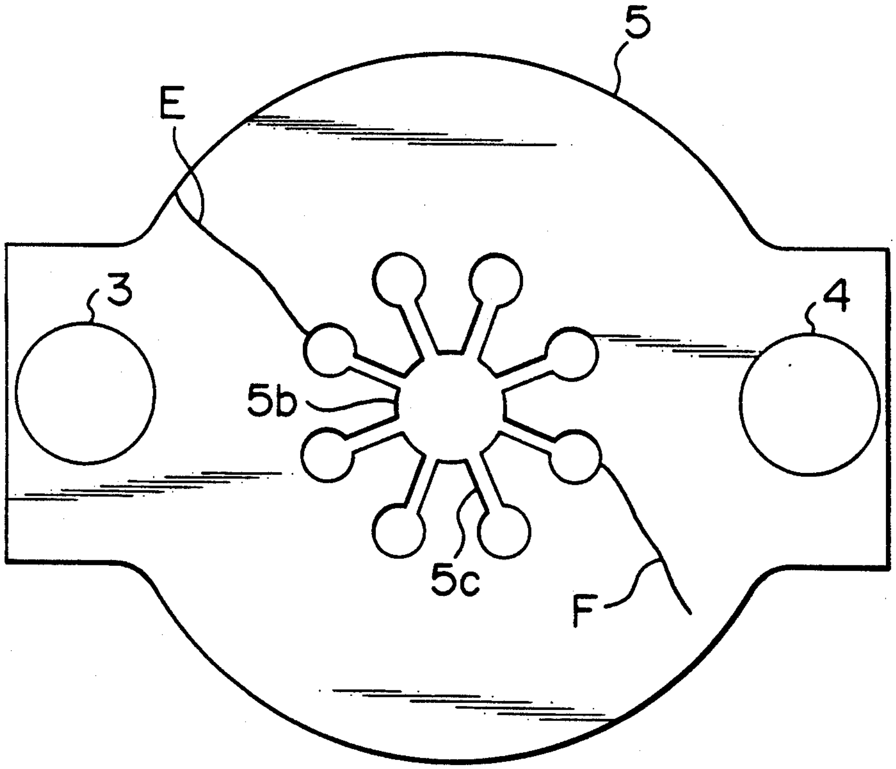
FIG. 5 PRIOR ART
FIG. 5 is a plan view of a broken bimetal.
Figure 6:
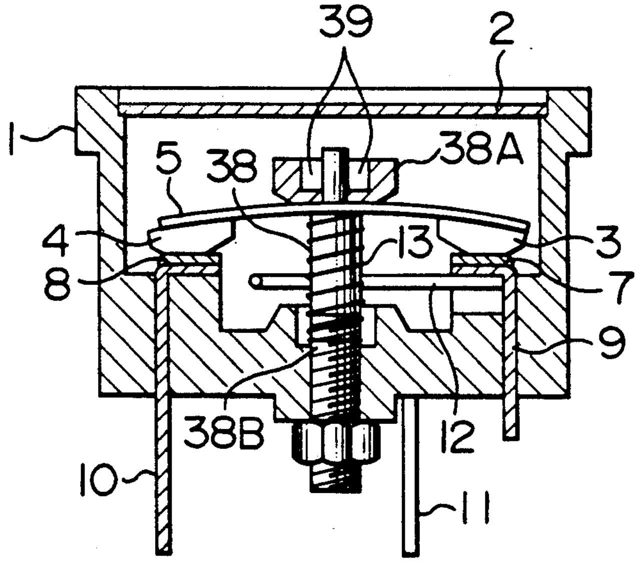
FIG. 6 PRIOR ART
FIG. 6 is an axial sectional view of still another conventional overload protective device.

If the motor 15 cannot be freed from the abnormality as described above, the bimetal 5 is made to repeatedly perform the inversion motion and the recovery motion. With the increase of the number of repetitions of these motions, the bimetal 15 is fatigued to break at least. In the above-described Japanese Utility Model Unexamined Publication No. 60-183349, the bimetal 5 of such type is used that a hole 5*b* into which the shaft 6 is to be fitted is formed thereround with radial slits 5*c* as shown in FIG. 5. After the bimetal 5 of this type has repeated the inversion and recovery motions as described above, it breaks from the tip end of the slit 5*c* as indicated by reference characters E, F.

As the bimetal 5 breaks in this way, the characteristic of the bimetal 5 is changed so that the inversion temperature and the recovery temperature are changed or, even if the inversion motion is performed, the interval of inversion motion is shortened due to reduction of the amount of inversion motion at the portions corresponding to the movable contacts 3, 4, with the result that the flow rate of the locked rotor current to the bimetal 5 and heater wire 12 is increased to further raise the temperature in the case. Therefore, the movable contacts 3, 4 are made to be welded to the fixed contacts 7, 8, respectively. Upon the occurrence of such contact welding, a large locked rotor current is made to flow continuously to the coil of the motor 15 and to the bimetal 5 of the overload protective device 14 so as to cause the coil of the motor 15 to generate heat and burn. In addition, as the internal temperature of the case 1 is raised due to heat generated by the bimetal 5 and the heater wire 12 beyond the thermal resistance temperatures of the case 1 and the cover 2, the periphery of the bimetal 5 including the case 1, the cover 2 and the like is burnt.

Figure 12:
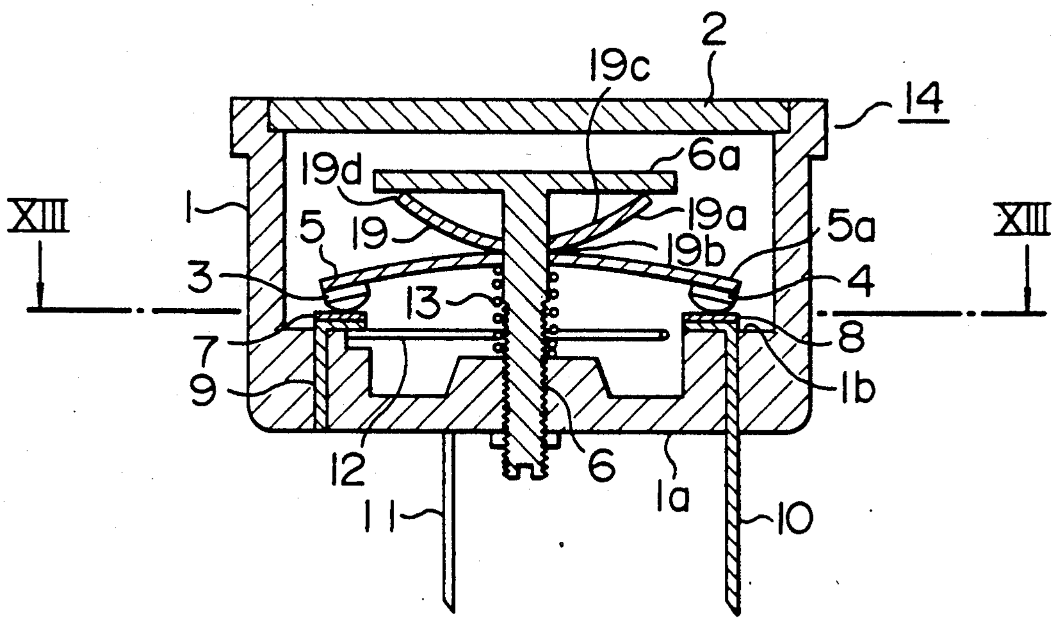
FIG. 12 is an axial sectional view of the overload protective device according to an embodiment the present invention.
Figure 13:
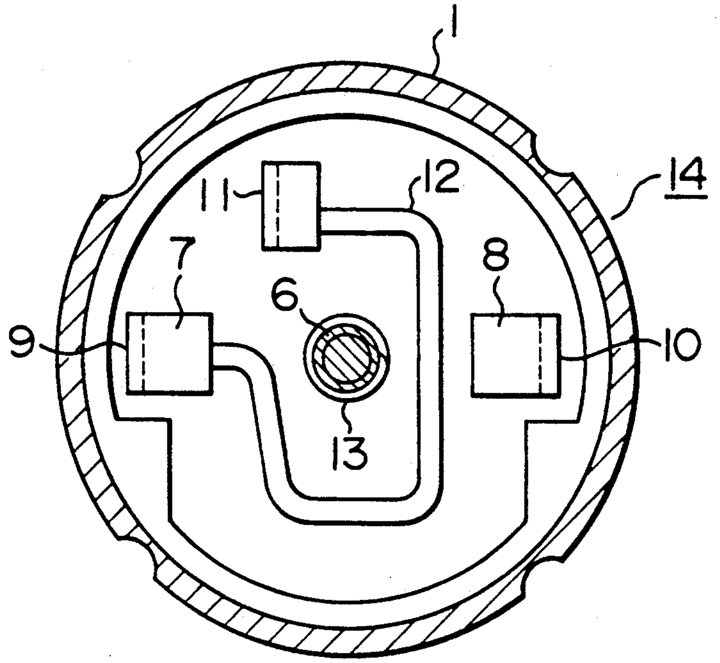
FIG. 13 is a sectional view taken along the line XIII—XIII of FIG. 12.

FIGS. 12 and 13 show an overload protective device according to an embodiment of the present invention. In these drawings, reference numeral 5*a* denotes a low expansion surface; 19 denotes a bimetal; 19*a* denotes a low expansion surface; 19*b* denotes a top portion; 19*c* denotes a high expansion surface and 19*d* denotes an upper peripheral edge, the portions corresponding to those of FIG. 1A being designated by the same reference numerals for omitting to repeat the explanation thereof.

Referring to FIGS. 12, 13, the shaft 6 has the bimetal 19 mounted thereon in addition to the bimetal 5 curved to project upwards in its original state, the bimetal 19 being curved to project downwards and located between the bimetal 5 and the head portion 6*a* of the shaft 6. The head portion 6*a* is in the form of a disk the diameter of which is greater than that of the upper peripheral edge 19*d* of the bimetal 19 so that the upper peripheral edge 19*d* and the top portion 19*b* at the center of projection of the bimetal 19 are brought into contact with the head portion 6*a* and the top portion at the center of projection of the bimetal 5 on the side of the low expansion surface 5*a*, respectively, by virtue of the biasing force of the spring 13. Further, the bimetal 19 comprises the low expansion surface 19*a* on the lower surface side (that is, on the side of the bimetal 5) and the high expansion surface 19*c* on the upper surface side (that is, on the side of the head portion 6*a* of the shaft 6) so that it is enabled to be inverted freely.

Due to application of loads of the bimetal 5 and the spring 13, the inversion temperature of the bimetal 19 becomes lower than that in the free state but it is set at a temperature higher than the inversion temperature of the bimetal 5. However, the closer is the inversion temperature of the bimetal to the inversion temperature of the bimetal 5, the more the bimetal 19 shows the effect. Further, the recovery temperature of the bimetal 19 is set to be sufficiently lower than the room temperature.

Construction other than the above is the same as the conventional device shown in FIG. 1A.

Figure 14:
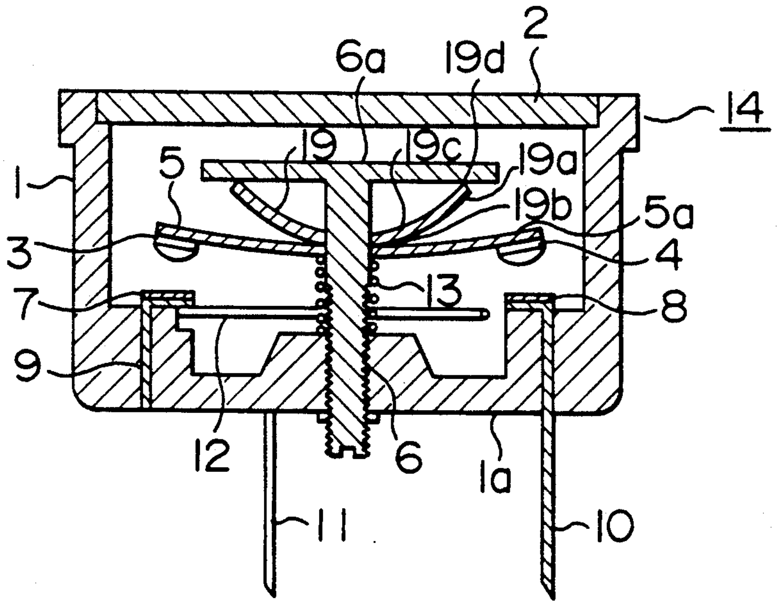
FIG. 14 is an axial sectional view of the embodiment shown in FIG. 12 in a state in which the bimetal is inverted before occurrence of abnormality.

In a case where the overload protective device 14 of such construction is used as being connected to the motor 15 as shown in FIG. 12, when there is caused something wrong with the motor 15 to make a large locked rotor current flow thereto, the temperature reaches the inversion temperature of the bimetal 5 and, at the same time, the bimetal 5 makes rapidly the inversion motion, so that the electric circuit is cut out. At this time, since the temperature is lower than the inversion temperature of the bimetal 19, the bimetal 19 is maintained in its original state as shown in FIG. 14. The moment the electric circuit is cut out, the temperature decreases. When the temperature reaches the recovery temperature of the bimetal 5, the bimetal 5 is restored to the original state so as to make again the electric circuit.

In case that the motor 15 is not freed from the abnormality and continued to be held in the locked state, the bimetal 5 is made to perform the inversion and recovery motions repeatedly, which causes the bimetal 5 to be fatigued to break as indicated by E, F in FIG. 5. As the time interval of repetition of the above motions is made shorter to increase the rate of supply of the locked rotor current to the bimetal 5 and the heater wire 12, the temperature in the case 1 is raised in excess of the inversion temperature of the bimetal 5.

Figure 15A:
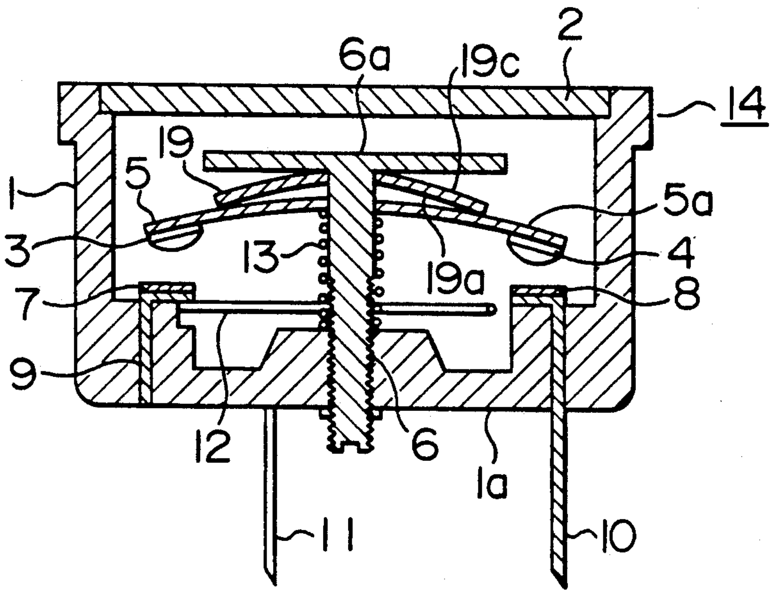
FIGS. 15A, 15B and 15C are axial sectional views of the embodiment of FIG. 12 respectively showing abnormalities.

As soon as the temperature in the case 1 reaches the inversion temperature of the bimetal 19, the bimetal 19 makes the inversion motion to be curved in the reverse direction. Accordingly, the biasing force applied to the bimetal 5 by the bimetal 19 becomes smaller than that by the spring 13 so that the bimetal 5 is lifted as shown in FIG. 15A. This makes the movable contacts 3, 4 separate from the fixed contacts 7, 8, respectively, thereby cutting out the electric circuit.

Due to this cutout of the electric circuit, the temperature in the case 1 begins to decrease. However, since the recovery temperature of the bimetal 19 is set to be sufficiently lower than the room temperature, the bimetal 19 cannot be restored to the original stage even if the temperature in the case 1 recovers its former value. For this reason, once the bimetal 19 makes the inversion motion, the bimetal 5 is held in the lifted state and, hence, the electric circuit is maintained as being cut out permanently.

Further, as the temperature in the case 1 decreases to reach the recovery temperature of the bimetal 5, the bimetal 5 is restored to the original state. This makes the movable contacts 3, 4 move downwards, and however, since the bimetal 5 is held in the lifted state as described above, a sufficient gap is left between the movable contacts 3, 4 and the fixed contacts 7, 8, resulting in that the electric circuit is hindered from being closed.

The above description has been concerned with the case where no contact welding takes place. Next, description will be given of the case where the contact welding takes place.

As the repetition of the inversion and recovery motions makes the bimetal 5 break as shown in FIG. 5, characteristics of the bimetal 5 themselves are changed greatly to cause an unbalance of acting force between one of sides to which the movable contact 3 is secured and the other side to which the movable contact 4 is secured. Consequently, movement of one of the movable contacts 3, 4 becomes slow so that the other movable contact serves to open and close the electric circuit in accordance with the inversion and restoration motions of the bimetal 5. In this state, the movable contact serving to make and break the electric circuit is welded to the associated fixed contact, with the result that a large locked rotor current flows continuously to raise the temperature in the case 1 abruptly. As the temperature reaches the inversion temperature of the bimetal 19, the bimetal 19 makes the inversion motion so that the bimetal 5 is lifted by the spring 13.

Figure 15B:
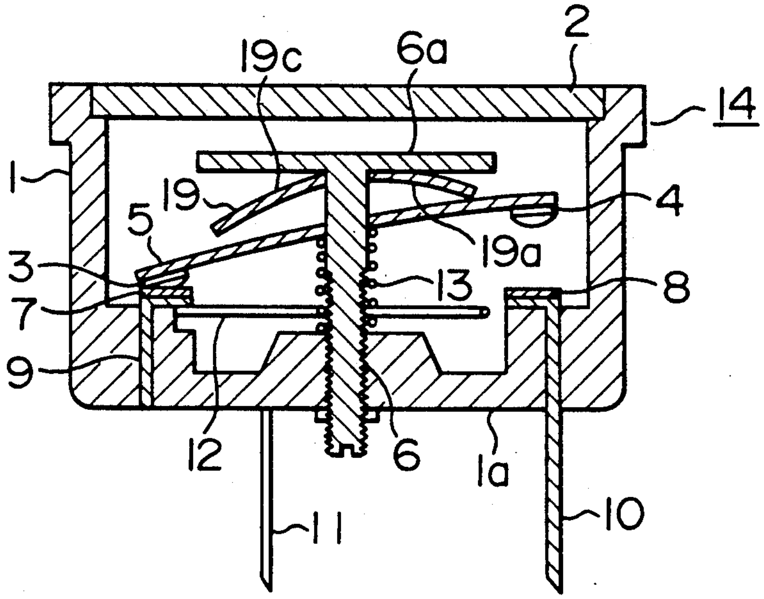

Assuming here that the movable contact 3 is welded to the fixed contact 7, as the bimetal 19 makes the inversion motion, the bimetal 5 is lifted at the side of the movable contact 4 which is not welded as shown in FIG. 15B, thereby cutting out the electric circuit. Even if the temperature in the case 1 decreases due to cutout of the electric circuit, the bimetal 5 can be held in the state shown in FIG. 15B in the manner described above.

Figure 15C:
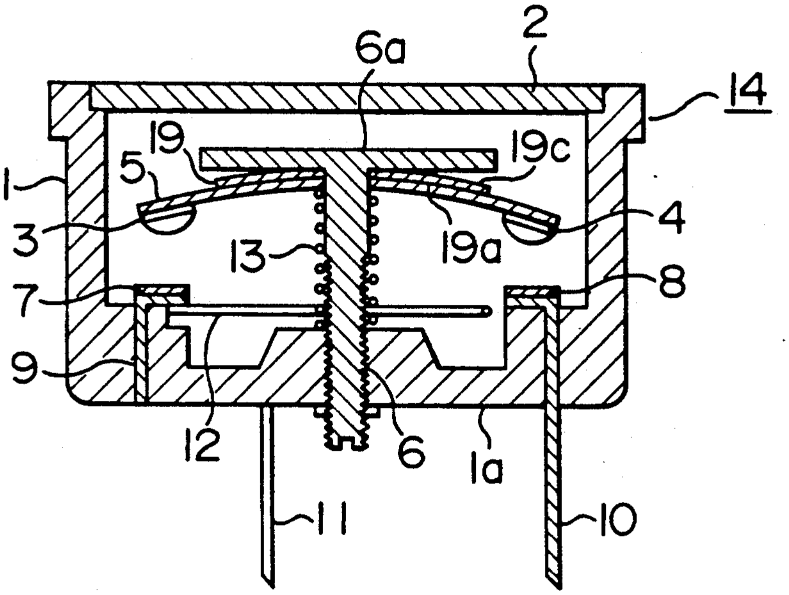

Further, when the bimetal 5 is lifted by the spring 13 due to the inversion motion of the bimetal 19, a shearing force is applied to the weld point of the movable contact 3. If the biasing force of the spring 13 overcomes this shearing force, the movable contact 3 is enabled to separate from the fixed contact 7. As a result, the bimetal 5 can be held in the horizontal state as shown in FIG. 15C, thereby breaking the electric circuit at both movable contacts 3, 4.

The closer the inversion temperature of bimetal 19 is to the inversion temperature of the bimetal 5, the sooner the bimetal 19 can act to cut out the electric circuit permanently if the locked state of the motor 15 continues to cause the bimetal 5 to move abruptly, thereby making it possible to prevent any burnout of the overload protective device 14 itself, the motor 15 and the like. It was confirmed that the above effects could be obtained through the experiment conducted by the present inventors in which, in consideration of the amount of scatter in the characteristics of the bimetal and the like, the inversion temperature of the bimetal 19 was set to be higher than the inversion temperature of the bimetal 5 in the range of 10° C. to 100° C. and the recovery temperature thereof was set to be lower than the room temperature.

As described above, according to this embodiment, merely by modifying the conventional device shown in FIG. 1*a* such that the shape of the head portion 6*a* of the shaft 6 is changed somewhat and one more bimetal 19 is added, the electric circuit can be cut out without fail even if the contact welding takes place, and the electric circuit can be maintained in the cutout state permanently once it is cut out and can be brought into the state available for the normal overload protection if the motor 15 is released from the locked state before the inversion motion of the bimetal 19, with the result that the high reliability can be maintained.

Further, since the movement of the bimetal 5 is controlled by the head portion 6*a* of the shaft 6, it is prevented from slipping out from the shaft 6 even if lifted due to the inversion motion of the bimetal 19. For this reason, there is no possibility that the bimetal 5 slips out from the shaft 6 to bring the movable contacts 3, 4 into contact with the fixed contacts 7, 8, the heater wire 12 and the like to cause an accident of short circuit or into contact with the cover 2 to bring about a secondary accident such as incomplete insulation.

Figure 16A:
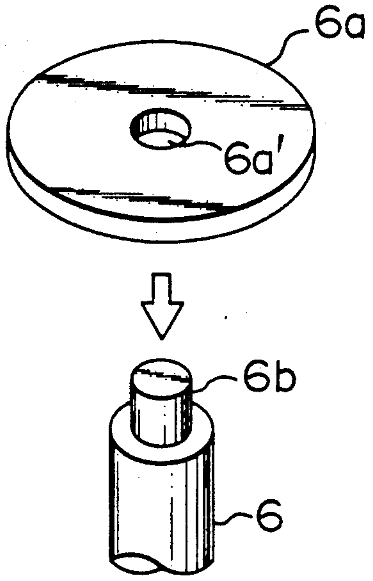
FIG. 16A and 16B are perspective views of practical examples of disassembled shafts and head portions thereof of the embodiment shown in FIG. 12.
Figure 16B:
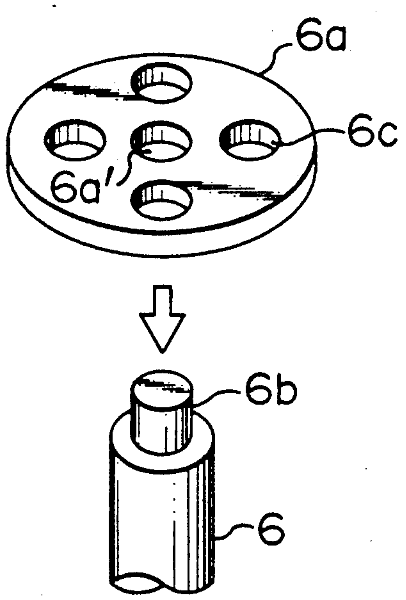

Incidentally, although the head portion 6*a* of the shaft 6 is formed integrally with the shaft 6 in FIG. 12, the shaft 6 and the head portion 6*a* may be formed separately so as to be combined together as shown in FIG. 16A or 16B. However, in the case of FIG. 16A, a coupling shaft 6*b* is formed at the tip end of the shaft 6 and a coupling hole 6*a'* is formed at the center of the head portion 6*a* so that the coupling shaft 6*a* is fitted by insertion into the coupling hole 6*a'* and, then, they are combined together by caulking or the like processing. Further, in the case of FIG. 16B, the head portion 6*a* is further formed therein with a desired number of through holes 6*c*. This is for the purpose of enabling heat generated from a compressor and the like arranged on the side of the cover 2 to be transferred efficiently to the bimetal 19 through the through holes 6*c* of the head portion 6*a*. This is effective to improve the response of the inversion motion of the bimetal 19, for example. It goes without saying that the shape of the through hole 6*c* can be determined arbitrarily and that it is more effective to enlarge the through hole 6*c* so far as the mechanical strength of the head portion 6*a* does not come into question. It is further effective to reduce the heat capacity by selecting the thickness and material of the head portion 6*a*.

Figure 17:
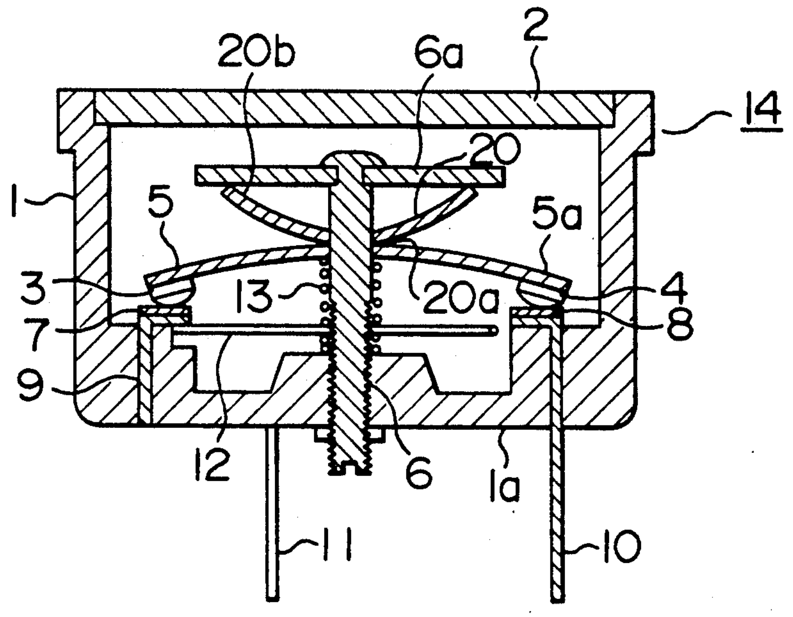
FIG. 17 is an axial sectional view of the overload protective device according to another embodiment of the present invention.

In FIG. 17, reference numeral 20 denotes a shape memory alloy plate; 20*a* denotes a top portion, and 20*b* denotes an upper peripheral edge. The portions corresponding to those of FIG. 12 are designated by the same reference numerals.

In the embodiment shown in FIG. 12, the bimetal 19 is used as the thermally transformable member which serves to bring the electric circuit into the cutout state permanently. In the embodiment shown in FIG. 17, however, the bimetal 19 is replaced by the shape memory alloy plate 20 having a curved shape likewise.

Referring to FIG. 17, the shaft 6 has the shape memory alloy plate 20 mounted thereon between the bimetal 5 and the head portion of the shaft 6, the shape memory alloy plate 20 being curved to project downwards (that is, to the bimetal 5). The top portion 20*a* and the upper peripheral edge 20*b* of the shape memory alloy plate 20 are brought into contact with the bimetal 5 and the head portion 6*a* of the shaft 6, respectively, by virtue of the biasing force of the spring 13. The shape memory alloy plate 20 has memorized therein a flat shape on the high temperature side due to the irreversible shape memory effect thereof.

When the bimetal 5 breaks to increase the rate of supply of the large locked rotor currents so as to raise the temperature up to the inversion temperature of the shape memory alloy plate 20, the shape memory alloy plate 20 is changed suddenly from the cured shape into the flat shape. For this reason, the shape memory alloy plate 20 and the bimetal 5 are lifted by the spring 13 until they are pressed against the head portion 6*a* of the shaft 6. Accordingly, the movable contacts 3, 4 are separated from the fixed contacts 7, 8 permanently.

It is noted that, in the present embodiment, the head portion 6a of the shaft 6 is attached to the shaft 6 in the manner described in connection with FIG. 16A.

Further, it goes without saying that the inversion temperature of the shape memory alloy plate 20, that is, the shape memory temperature, is set to be higher than the inversion temperature of the bimetal 5 in the range of 10° C. to 100° C. like the bimetal 19 of the embodiment of FIG. 12.

In addition, the material used as the shape memory alloy plate 20 is not particularly limited but includes the conventional titanium-nickel alloy, copper-base alloy, iron-base alloy and the like. Therefore, by selecting suitably the material, arbitrary temperature specification can be set over a wide range so that an overload protective device of wide use can be provided.

Moreover, the curved shape of the shape memory alloy plate 20 itself is never changed depending on the change of the ambient temperature, not to speak of the change of the normal working range of the bimetal 5, and therefore, the shaft support position of the bimetal 5, that is, the contact portion between the shape memory alloy plate 20 and the bimetal 5, is stabilized in a fixed position. As a result, since the radius of curvature based on which the inversion temperature of the bimetal 5 is decided is never changed, there can be obtained an overload protective device of stable working temperature.

As described above, in the present embodiment, as the bimetal 5 is fatigued to break to raise the temperature in the case 1, the electric circuit is completely cut out before the contact welding takes place, thereby making it possible to prevent perfectly the burnout of the overload protective device itself, not to speak of the motor coil. Further, even if the contact welding takes place, it is possible to tear off the welded contacts from each other by force, thereby further improving the reliability of the overload protective device.

In the embodiment shown in FIG. 12, when the bimetal 19 makes the inversion motion, it is curved in the reverse direction to that of the original state as shown in FIG. 15A. Therefore, even if the bimetal 5 is lifted, the movement thereof is limited by the peripheral edge of the bimetal 19 and hence the amount of movement of the bimetal is restricted correspondingly to that limited movement. To the contrary, in the embodiment shown in FIG. 17, since the shape memory alloy plate 20 becomes flat when the temperature reaches the inversion temperature thereof, the bimetal 5 is lifted up to the utmost limit. Therefore, in the present embodiment, the distance left between the movable contacts 3, 4 and the fixed contacts 7, 8 when the bimetal 5 is lifted can be maintained greater than that in the embodiment shown in FIG. 12, and furthermore, assuming that the distance concerned is equalized, the device of this embodiment can be made smaller in thickness in comparison with the embodiment shown in FIG. 12.

Figure 18A:
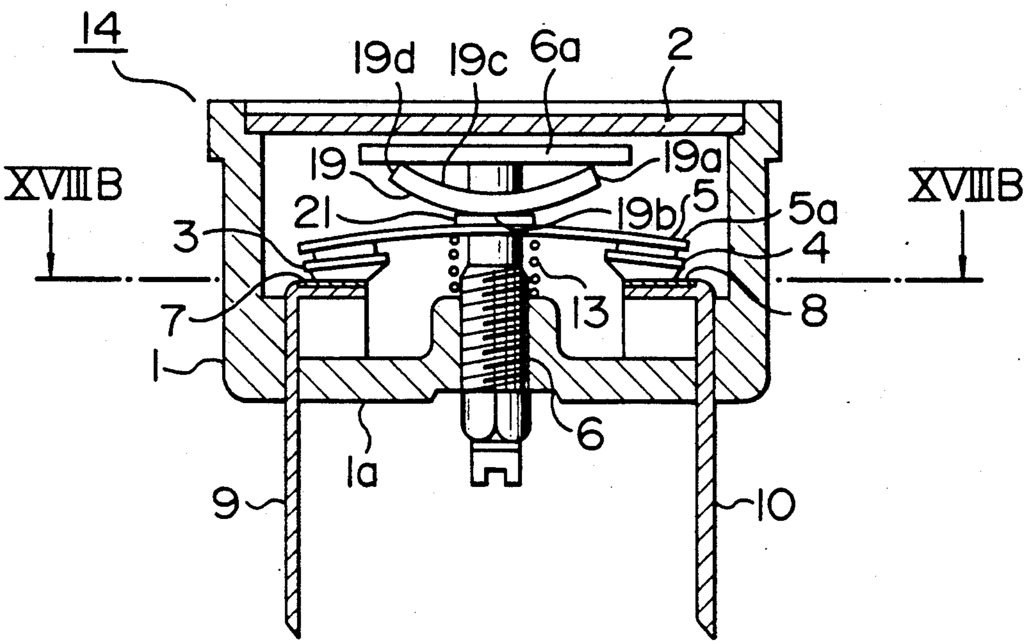
FIG. 18A is an axial sectional view of an overload protective device according to still another embodiment of the invention.
Figure 18B:
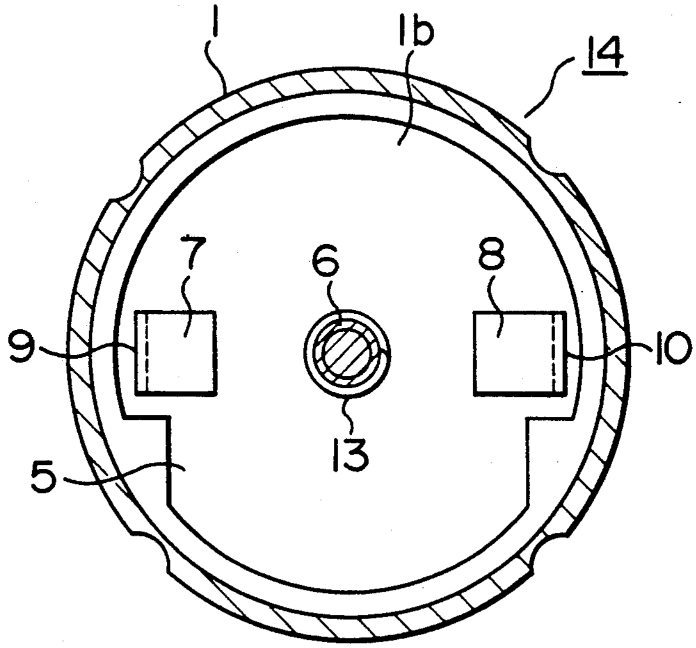
FIG. 18B is a sectional view taken along the line XVIIIB—XVIIIB of FIG. 18A.

In FIG. 18A, the washer 21 is arranged between the bimetals 5 and 9, and the fixed terminal 9 having the fixed contact 7 secured thereto is made to project to the outside of the case 1 instead of arranging the heater wire similarly to the conventional device shown in FIG. 3. This embodiment differs from the embodiment shown in FIG. 12 in these points. The device of this embodiment is connected to the motor 15 in the manner shown in FIG. 4.

The device of this embodiment is operated as well in the same manner as the aforementioned embodiment and the same effects can be achieved. In addition, since the bimetal 5 is pressed against the flat washer 21 by the biasing force of the spring 13, the point of support of the bimetal 5 is fixed in a region substantially equal to the diameter of the washer 21. Consequently, the inversion temperature and the recovery temperature of the bimetal 5 are stabilized until the bimetal 5 is fatigued to break, so that there is caused no scatter in the movement of the bimetal 5 and the inversion temperature of the bimetal 9 is permitted to approach closer to the inversion temperature of the bimetal 5.

To the contrary, in case that the bimetals 5, 19 of the curved shape are made to come in contact with each other at their respective top portions as described in connection with the embodiments of FIGS. 12 and 17, the pressure point and the pressing force of the spring 13 to the bimetal 5 are not symmetrical with respect to the center of the bimetal 5. Consequently, the point of support of the bimetal 5 against the bimetal 19 is varied, in some cases, each time the bimetal 5 makes the inversion or recovery motion, resulting in that the inversion temperature and the restoration temperature of the bimetal 5 are changed.

The present inventors have confirmed that the present embodiment has satisfactory performance stability and reliability.

Incidentally, in the embodiments shown in FIGS. 12 and 17, it is possible to arrange the same washer so as to obtain the same effects.

Figure 19:
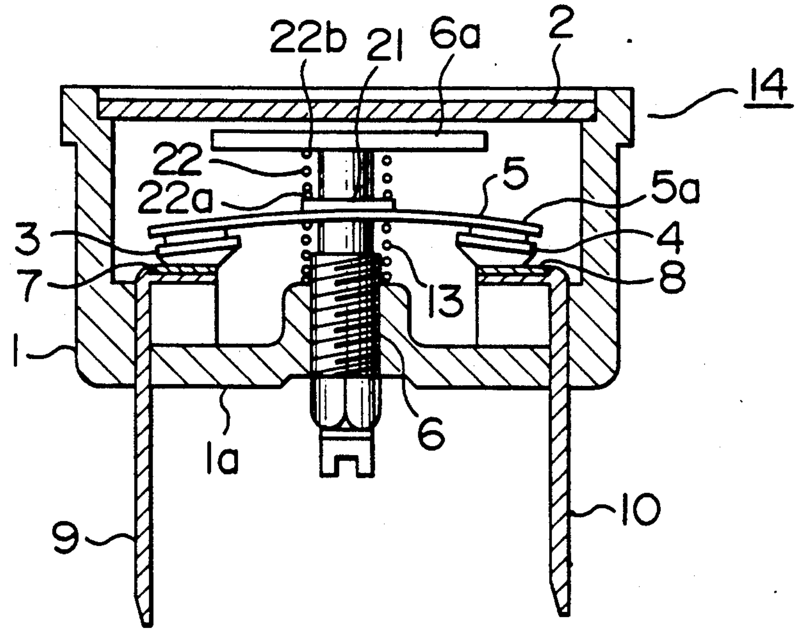
FIGS. 19, 20 and 21A are axial sectional views of other embodiments of the present invention, respectively.

In FIG. 19, the reference numeral 22 denotes a coiled shape memory alloy member and the portions corresponding to those of FIG. 18A are designated by the same reference numerals.

In this embodiment as well, no heater wire is used in the overload protective device.

Referring to FIG. 19, the washer 21 and the coiled shape memory alloy member 22 are mounted on the shaft 6 between the bimetal 5 and the head portion 6a of the shaft 6 in such a manner that the washer 21 is in contact with the bimetal 5 and the coiled shape memory alloy member 22 is arranged between the washer 21 and the head portion 6a of the shaft 6. Accordingly, the bimetal 5 is set in the fixed position by virtue of the biasing forces of the coiled shape memory alloy member 22 and the spring 13.

The coiled shape memory alloy member 22 has memorized therein such a shape that the winding of the coil is made to stick to each other on the high temperature side due to the irreversible shape memory effect, that is, the unidirectional property thereof.

Construction other than the above is the same as the embodiment shown in FIG. 18A.

In the present embodiment, the bimetal 5 moves in the same manner as the above-described embodiments until the bimetal 5 is fatigued to break.

As the bimetal 5 breaks to increase the rate of current flow to the bimetal 5 so as to raise the temperature in the case 1 up to the shape memory temperature of the coiled shape memory alloy member 22, the coiled shape memory alloy member 22 is brought into the contracted state so as to be reduced in the overall length thereof, and therefore, the washer 21 and the bimetal 5 are lifted by the spring 13 correspondingly to the thus reduced length, thereby cutting out the electric circuit.

It is therefore possible in the present embodiment as well to obtain the same effects as the aforementioned embodiments.

It is the same matter as the aforementioned embodiments that the shape memory temperature, that is, the transformation point, of the coiled shape memory alloy member 22 is also set to be higher than the inversion temperature of the bimetal 5 in the range of 10° C. to 100° C.

Further, the washer 21 and the coiled shape memory alloy member 22 shown in FIG. 19 may be used in the embodiment shown in FIG. 12 as well in place of the bimetal 19.

In addition, so far as the shape is changed but never restored depending on the temperature, any material consisting of arbitrary combination of elements is available whether it may be a plate of a wire and whether its sectional shape may be round or rectangular.

Figure 20:
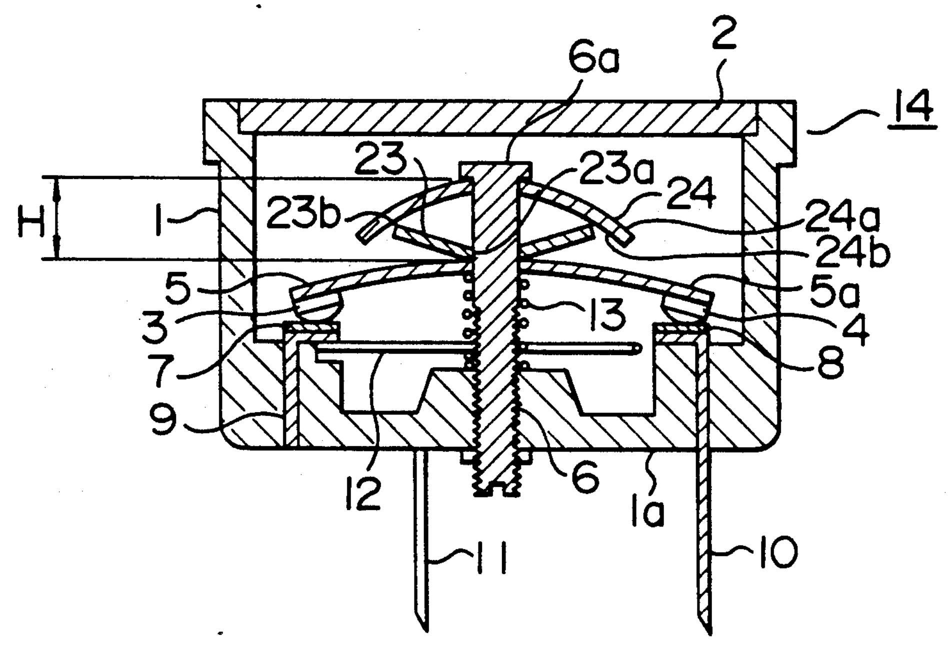

In FIG. 20, the washer 23 and the bimetal 24 are mounted on the shaft 6 between the head portion 6*a* of the shaft 6 and the bimetal 5. The washer 23 is curved to project downwards (that is, towards the bimetal 5) and a top portion 23*a* thereof is in contact with the top portion of the bimetal 5. The bimetal 24 is arranged between the head portion 6*a* of the shaft 6 and the washer 23 and is curved in the same direction of curvature as the bimetal 5. The top portion of the bimetal 24 is in contact with the head portion 6*a* of the shaft 6. Further, an upper peripheral edge portion 23*b* of the washer 233 is in contact with a high expansion surface 24*b* which is the lower surface of the bimetal 24. The upper surface of the bimetal 24 is a low expansion surface 24*a*.

With such construction, the bimetal 5 moves in the same manner as the aforementioned embodiments until the bimetal 5 is fatigued to break.

As the bimetal 5 breaks to increase the rate of current flow to the bimetal 5 so as to raise the temperature in the case 1 up to the inversion temperature of the bimetal 24, the bimetal 24 makes the inversion motion to be curved in the same direction of curvature as that of the washer 23. Therefore, the washer 23 and the bimetal 5 are lifted by the spring 13 in such a manner that the concave upper surface of the washer 23 is fitted on the high expansion surface 24*b* of the bimetal 24. This results in the cutout of the electric circuit.

In this way, in the present embodiment as well, the same effects as those of the aforementioned embodiments can be obtained.

In this embodiment, however, since the washer 23 is arranged between the bimetals 5 and 24, heat generated by the bimetal 5 becomes hard to be conducted to the bimetal 24 due to the shielding effect of the washer 23, and therefore, the response of motion of the bimetal 24 is lowered correspondingly, thereby slowing the motion on the occasion of abnormality taking place in the bimetal 5. To cope with this, by setting the inversion temperature of the bimetal 24 to be equal to or lower than the inversion temperature of the bimetal 5, it is possible to speed up the response.

Further, in connection with the dimensional accuracy, relative position to the shaft 6 and the like of the washer 23 and the bimetal 24, the stability in the position of the bimetal 24 is dispersed with respect to the horizontal direction perpendicular to the paper of the drawing, and there is a possibility that the position concerned is changed each time the bimetal 5 makes the inversion and restoration motions before it breaks.

Moreover, since the bimetal 24 curved in the same direction of curvature as the bimetal 5 and the washer 23 curved in the reverse direction thereto are arranged between the bimetal 5 and the head portion 6*a* of the shaft 6, the distance H between the head portion 6*a* and the bimetal 5 increases as a matter of course, resulting in that the size of the device is increased in comparison with the aforementioned embodiments.

Incidentally, the device of this embodiment can dispense with the heater wire 12.

Figure 21A:
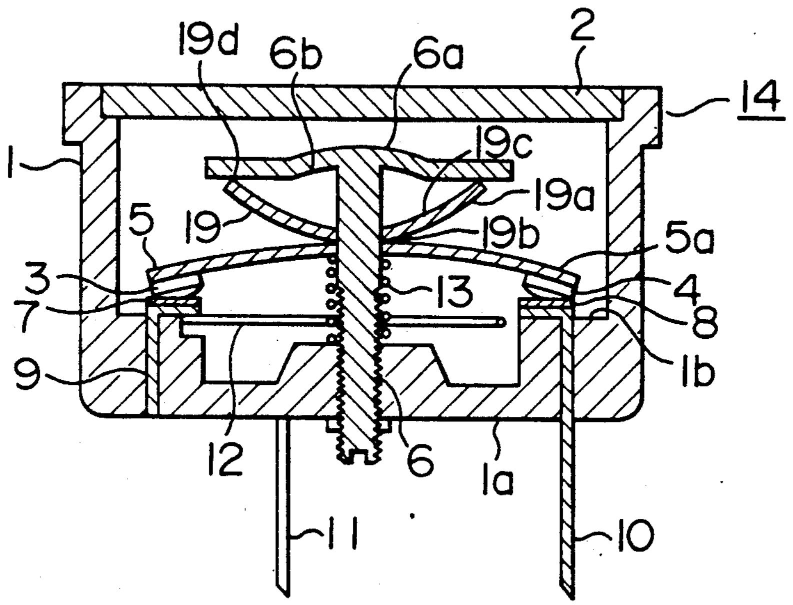

FIG. 21A shows the state where the electric circuit is made, which state represents normal conditions of this embodiment. In this embodiment, the head portion 6*a* attached to the shaft 6 is formed in the central portion thereof (in the portion near the root of joint with the shaft 6) with the curved surface portion 6*b* which is curved to project upwards (towards the cover 2), and the construction other than this point is the same as the embodiment shown in FIG. 12. One of surfaces of the curved surface portion 6*b* which faces to the bimetal 19 is the same curved surface as the high expansion surface 19*c* of the bimetal 19 in the inverted state.

Figure 21B:
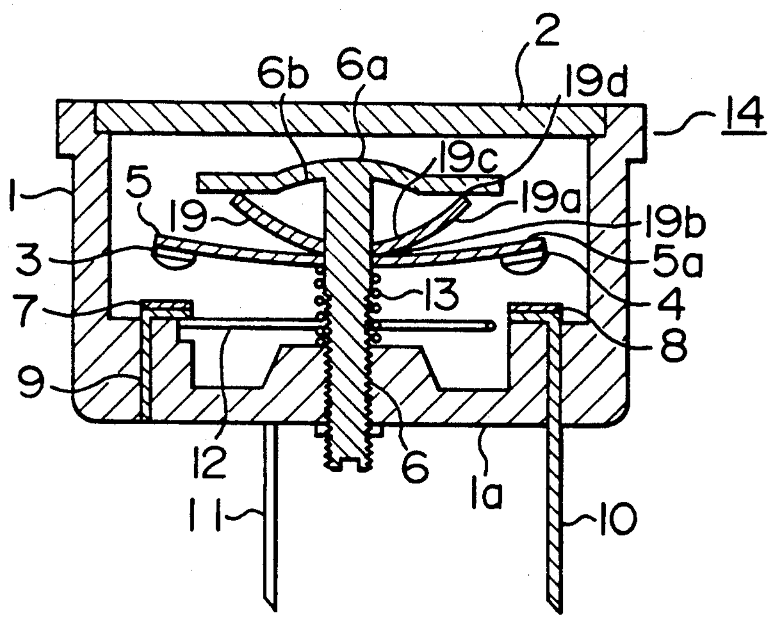
FIGS. 21B and 21C are sectional views for explaining the operation of the overload protective device of FIG. 21A.

FIG. 21B shows the state where the bimetal 5 is inverted and hence the electric circuit is broken, which state corresponds to the state of FIG. 14 of the embodiment shown in FIG. 12.

Figure 21C:
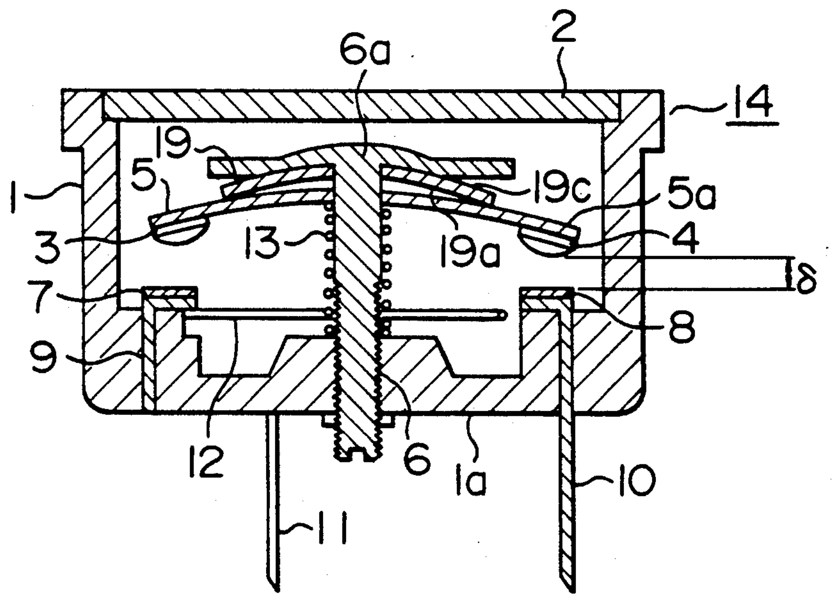

FIG. 21C shows the state where the bimetal 19 is inverted due to occurrence of abnormality. This state corresponds to the state of FIG. 15A of the embodiment shown in FIG. 12, and however, in this state, the inverted bimetal 19 is fitted into the curved surface portion 6*b* of the head portion 6*a* so that the bimetal 19 is displaced upwards a corresponding amount to this fitting too much as compared with the state of FIG. 15A. Accordingly, the contact gap $\delta$ can be increased and, hence, the electric circuit can be held in the cutout state more stably as compared with the embodiment of FIG. 15A.

Embodiments of the present invention have been described above as being used to protect the motor from the overload, and however, the present invention is not limited to this use. Further, the values and the like given in the explanation of the embodiments are no more than the examples.

Another different embodiment of the present invention is obtained by improving the conventional device of FIG. 1A in the following points. Namely, the kind and diameter of the heater wire 12 connected between the first fixed terminal 9 which is fixed to the bottom surface 1*a* of the case 1 by piercing through the bottom of the case 1 and the heater terminal 11 serving as the second fixed terminal are so selected that the heater wire 12 is heated to a temperature below the maximum usable temperature reported, for example, in Table 1 "Kind and Notation" in JIS. C. 2520 "Alloy Wire and Band for Heater" with the self-heating energy decided by the product of the rated starting current and rated starting time of the motor 15, and to a temperature above the melting point of the heater wire 12 with the self-heating energy decided by the product of the flowing current more than the rated starting current and the rated starting time.

Further, with the self-heating energy of the heater wire 12 decided by the product of the locked rotor current and the operating time when the locked rotor current drawn by the motor 15 is made to flow to cause the bimetal 5 to make the inversion motion, the heater wire is designed to be heated to a temperature below the maximum usable temperature of each kind of wire similarly to the above case where the rated starting current flows.

When the overload protective device of such construction is used in the circuit shown in FIG. 2, in a state where the motor 15 rotates under normal conditions, after the starting current which is a large current flows to the heater wire 12 for a short time, the small operating current flows continuously thereto. Usually, the time during which the starting current flows is limited to two seconds or less by the action of the stater 16 or the like.

In this case, the bimetal 5 does not make the inversion motion depending on the temperature rise attributable to the heating energy of the bimetal 5 itself and the heating energy of the heater wire 12 similarly to the prior art.

Further, as an excessive locked rotor current, the maximum value of which is the starting current, flows to the motor 15 continuously, the self-heating energies of the bimetal 5 and the heater wire 12 are increased and, as soon as the operating temperature of the bimetal 5 is reached, the bimetal 5 itself suddenly makes the inversion motion, resulting in that the movable contacts 3, 4 are caused to separate from the fixed contacts 7, 8 so that the current flow to the motor 15 is interrupted.

After the interruption of the current supply, the bimetal 5 and the heater wire 12 begin to cool down. Then, as soon as the recovery temperature is reached, the bimetal 5 reverses the inversion motion to the above motion so as to be restored to the original state, resulting in that the movable contacts 3, 4 are brought into contact with the fixed contacts 7, 8 to thereby permit the current to flow again to the motor 15.

After the recovery described above, if the motor 15 is released from the locked state, the motor 15 can be operated under normal conditions and the inversion motion of the bimetal 5 is stopped here in the quite same manner as the prior art.

However, in the midst of the condition that the locked state is continued so that the bimetal 5 is made to perform the inversion motion repeatedly, if the bimetal 5 is fatigued to break as indicated by reference characters E and F in FIG. 5, reduction is brought about in the amount and force of inversion motion of the bimetal 5, resulting in the contact welding.

If the contact welding takes place, a large locked rotor current continues to flow to the bimetal 5 and the heater wire 12 connected in series thereto successively so that the temperature becomes higher as compared with the case where the bimetal 5 is normally operated.

Further, the temperature of the coil of the motor 15 is also raised concurrently so that, with the lapse of current flow time, the insulating material is melted to deteriorate the insulating ability, resulting in a local breakdown at last.

Taking notice of the short-circuit current which flows at the time of occurrence of the local breakdown, the present inventors made an attempt that the energy of the short-circuit current was utilized to melt and break the heater wire 12 so as to interrupt the current flow to the motor 15, thereby preventing the burnout of the overload protective device, not to speak of the burnout of the coil of the motor 15.

In the first place, assuming that the contact welding took place in the overload protective device, current was made to flow continuously to the motor 15 in the locked state without connecting the overload protective device thereto. Throughout the whole process by which the burnout was caused to occur, the relationship between the current flow time and the temperature rise and current of the coil and the like were investigated by making an experiment using the load shown in Table 1.

TABLE 1

| Voltage of power source | Output of motor | Rated starting current | Operating current |
|---|---|---|---|
| AC 100 V | 100 W | 11.5 A | 1.9 A |

Figure 22A:
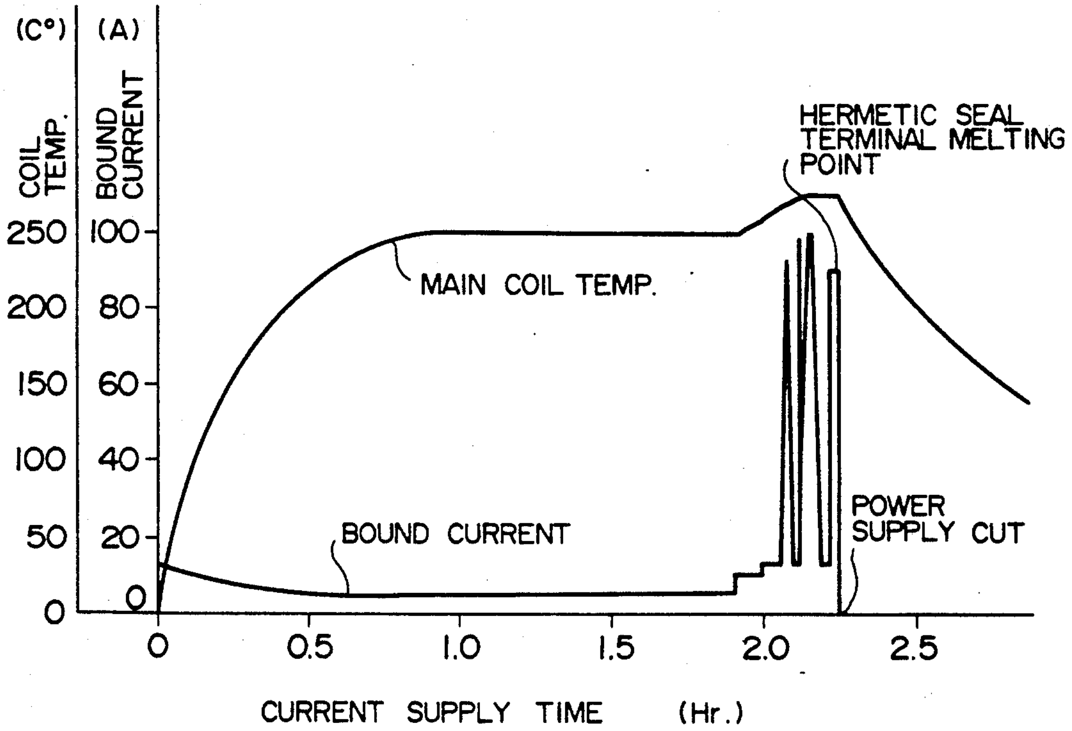
FIG. 22A and 22B are graphs showing characteristics obtained when the motor is supplied with current continuously through the electric circuit of FIG. 2 with the overload protective device shown in FIG. 1A removed.
Figure 22B:
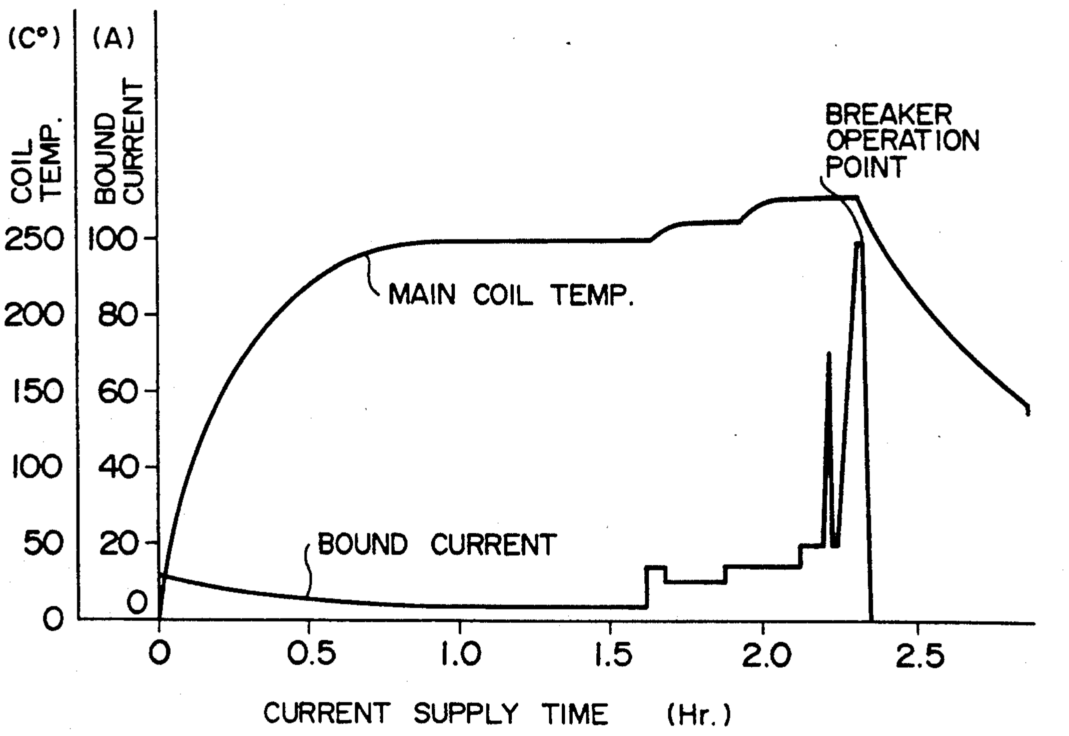

As a result, it was ascertained that, with the lapse of time, the temperature of the coil increased and the current was caused to change as shown in FIGS. 22A and 22B. Namely, it proved that, in either case, a short-circuit was caused between the portions the insulation of which was deteriorated after the lapse of a definite time, a current which is several times more than the locked rotor current was made to flow intermittently for about six seconds, and the repetition of such short-circuit brought the coil to tend toward full burnout, and, as a final trouble mode, electricity was caused to leak due to breakdown.

Further, it proved that, in the motor 15 for compressor use, as the motor 15 was burnt out, glass insulators (not shown) of hermetic sealing terminals (not shown) used for electric connection between the motor 15 and the outside were stained by a carbide, resulting in that the short-circuit current was caused to flow between the hermetic sealing terminals. In some cases, the glass portions of the hermetic sealing terminals were heated to redness and molten so that a refrigerant (not shown) sealed in the compressor was made to be about to spout together with a refrigerating machine oil.

Moreover, it proved that when a leakage circuit breaker (not shown) or an overcurrent circuit breaker (not shown) equipped in the power source came into action, the circuit was cut out before arrival in the above-mentioned states, and however, in case that the above-mentioned phenomena are caused before or simultaneously with actuation of the various circuit breakers, there are supposed some cases where these phenomena cannot be prevented completely.

Accordingly, the present inventors tried to obtain a safety range due to an experiment within which the heater wire 12 is not melted under usual working conditions but it is melted at the time of the aforesaid abnormality by the short-circuit current which flows in case of a relatively slight burnout before actuation of the various circuit breakers, that is, in case of a local layer short of the coil taking place at an early stage.

In the above experiment using the load, since it cannot be said that the leakage circuit breaker is always equipped, an overcurrent circuit breaker of 15 A which is used commonly was equipped on the power source side so as to confirm the limit value at which the heater wire 12 was melted before actuation of the overcurrent circuit breaker.

Before starting the experiment, non-fusing current and fusing current of the heater wire 12 were defined as follows:

1. Non-fusing current

The non-fusing current is the current which does not cause the heater wire 12 to melt when the bimetal 5 of the overload protective device is operated under normal conditions with flowing the current of 1.15 times the rated starting current of the motor 15.

2. Fusing current

The bimetal 5 of the overload protective device is restrained from making the inversion motion and then the non-fusing current is made to flow for two seconds with this non-fusing current regarding as the starting point. Thereafter, the flowing current is increased at 0.2 A pitch every two seconds until it causes the heater wire 12 to melt, which current is the fusing current.

In the experiment, the overload protective device having the characteristics shown in Table 2 was used and a plurality of heater wires 12 shown in Table 3 were produced by way of trial using the wires of the kinds reported in JIS.C.2520 but varying the diameter. Since the non-fusing current and fusing current of each heater wire 12 had been obtained beforehand using samples produced separately, a confirmation test was made afterwards on the overload protective device and the heater wires in combination with an experimental device.

TABLE 2

Characteristics of Overload Protective Device

| Items of characteristics | Specifications | |
|---|---|---|
| Bimetal inversion current | Conditional temperature | 60° C. 2.8 A |
| Bimetal inversion temperature | | 150° C. |
| Bimetal restoration temperature | | 70° C. |
| Bimetal inversion time | Conditional temperature | 25° C. 8.8 A for 10 seconds |
| Heater resistance | | 330 mΩ |

TABLE 3

Specifications of Heater Wire 12

| Kind of wire | Wire diameter | Non-fusing current | Fusing current |
|---|---|---|---|
| NCHW1 | 0.55 φ | 11.1 A | 13.1 A |
| | 0.60 φ | 13.3 A | 15.5 A |
| | 0.65 φ | 15.6 A | 18.3 A |
| | 0.70 φ | 18.0 A | 21.3 A |
| | 0.75 φ | 20.7 A | 24.4 A |
| FCHW1 | 0.65 φ | 14.5 A | 17.0 A |
| | 0.70 φ | 16.7 A | 19.0 A |
| | 0.75 φ | 19.2 A | 22.8 A |

As a result, it was confirmed that the heater wire melted before the circuit breaker came to action in the range shown in Table 4.

TABLE 4

Test Result of Combination with Experimental Machine

| Kind of wire | Wire diameter | Fusing of heater | Operation of 15 A circuit breaker | Ratio of supply current to starting current |
|---|---|---|---|---|
| NCHW1 | 0.55 φ | Yes | No | 1.13 |
| | 0.60 φ | Yes | No | 1.36 |
| | 0.65 φ | Yes | No | 1.59 |
| | 0.70 φ | Yes | No | 1.85 |
| | 0.75 φ | No | Yes | 2.12 |
| FCHW1 | 0.65 φ | Yes | No | 1.49 |
| | 0.70 φ | Yes | Yes | 1.71 |
| | 0.75 φ | No | Yes | 1.98 |

Figure 23A:
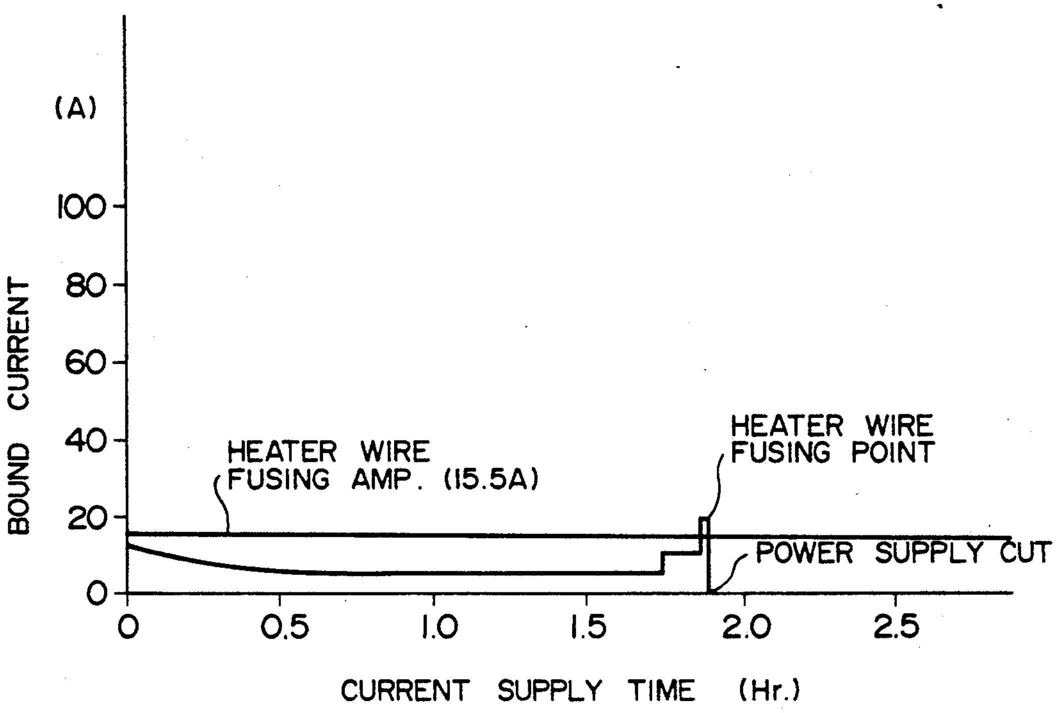
FIGS. 23A and 23B are graphs showing characteristics obtained when the motor is supplied with current continuous with an overload protective device according to the fourth embodiment of the present invention connected to the electric circuit of FIG. 2.
Figure 23B:
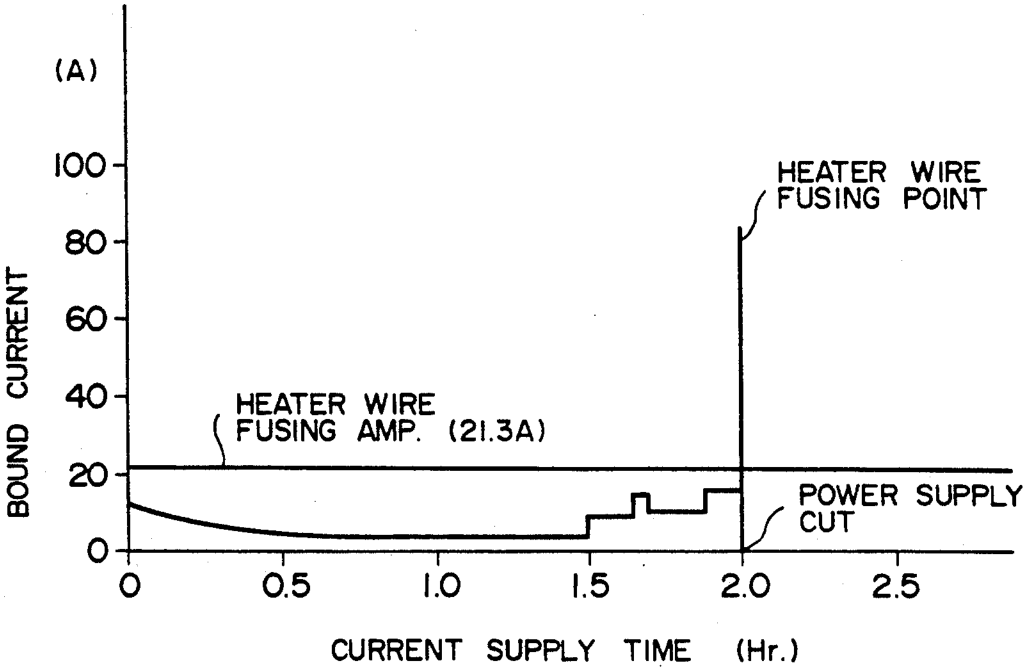
Figure 24:
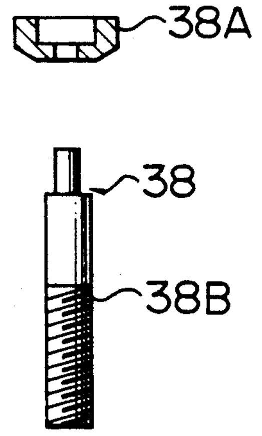
FIGS. 24 and 25 are disassembled views each showing, in section, an adjust screw and a head portion thereof used in the overload protective device according to the fifth embodiment of the invention.
Figure 25:
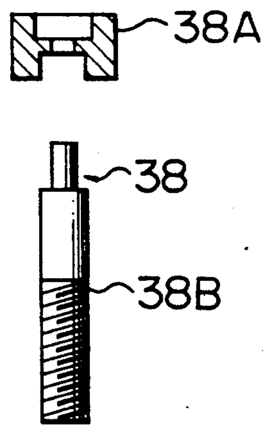

On the other hand, FIGS. 23A and 23B show, by example the monitoring result of the fusing point and the fusing characteristic of the heater wire 12 relative to the current change of the motor 15 obtained at that time.

Based on the results of investigation described above, a prospect was obtained that it is possible to cut out the motor 15 from the electric circuit at the stage when the insulation of the coil was being deteriorated with the short-circuit current energy of below 1.85 in the ratio of the flowing current to the rated starting current.

Next, concerning the overload protective device shown in FIGS. 2 and 3, test was made on an overload protective device produced by way of trial, in which device a copper wire terminal corresponding to the heater terminal 11 was newly provided and a copper wire of a diameter fusible at the ratio of the flowing current to the starting current being 1.85 was additionally connected between the copper wire terminal and the fixed terminal 9. As a result, it could be proved that the copper wire concerned has the same effect as the aforementioned heater wire 12 likewise.

Based on the series of results of investigation described above, the present inventors have decided the conditions requisite for the heating means such as the heater wire 12, copper wire or the like, of the overload protective device as follows:

1. The non-fusing current is under 1.15 times the rated starting current of the motor 15 when the voltage regulation of the power source is estimated at 15% extra.

For example, in the load mentioned before, it is calculated as $11.5\ A \times 1.15 \approx 13.3\ A$. Therefore, the wire of the kind NCHW1 and diameter 0.55 φ shown in Table 4, which was caused to melt at the ratio 1.13, is not available.

2. The lower limit value of the fusing current is decided on the basis of the relation between the fusing current and the minimum no-fusing current which satisfies the above condition of the non-fusing current.

For example, concerning the above-described heater wire 12, the kind of wire is NCHW1, the wire diameter is 0.66 φ, the non-fusing current is 13.3 A and the fusing current is 15.5 A.

3. The upper limit value of the fusing current is obtained when the ratio of the rated starting current to the flowing current is 1:1.85.

From the results of the above conditions, the range of the flowing current which causes the heater wire 12 to melt is obtained as follows based on the rated starting current of the motor 15.

1. The lower limit is 1.35.

$$\frac{15.5\ A}{11.5\ A} \approx 1.35$$

2. The upper limit is of course 1.85.

Further, even if the insulation of the motor coil is deteriorated due to a flaw in the molding process thereof or the coil having a faulty portion such as a pin-hole is permitted to be conveyed to the succeeding steps without being removed by the selecting operation, in case that the short-circuit current energy at this time more than causes the heater wire or copper wire to melt, it is possible to cut out the electric circuit.

In addition, according to this embodiment, since it is not necessary to add any special part for the purpose of improving the safety, it is possible to easily provide using the conventional facilities. Incidentally, the heating means is not limited to the heater wire and copper wire but may be any wire so far as it melts within two seconds when carrying the electric current of 1.35 to 1.85 times the rated starting current of the motor, such as nickel-chromium wire, ferrochromium wire, copper alloy wire and the like. In addition, the heating means may be a strip member.

Next, description will be given of the conventional overload protective device disclosed in Japanese Utility Model Unexamined Publication No. 64-35642 or 2-44232 with reference to FIGS. 6 to 10. An adjust screw 38 serving to hold the bimetal 5 is divided into a head portion 38A and a thread portion 38B which are combined with each other by a thermofusible metal 39 (such as tin of which melting point is 232° C., for example). In case of an abnormally high temperature, the thermofusible metal 39 melts to separate the head portion 38A from the adjust screw 38. Accordingly, if the contacts are welded to cause the overcurrent to go on flowing to the heater 12 which does not break as described before, the temperature increases to melt the thermofusible metal 39 so as to separate the head portion 38A of the adjust screw 38 from the thread portion 38B thereof, with the result that the coil spring 13 serving to hold the bimetal 5 pushes up the head portion 38A of the screw and the bimetal 5 to separate the contacts 3, 4 from the contacts 7, 8 overcoming the welding force between the contacts 3, 4 and 7, 8, thereby cutting out the electric circuit. Thereafter, the bimetal 5 is left as it is lifted by the coil spring 13 even if the temperature decreases, resulting in that the contacts 3, 4 are left as they are separated from the contacts 7, 8 so as to keep the electric circuit open.

In the above-mentioned prior art, slits 32*b*, 32*c*, 32*d*, 32*e*, 32*f* and 32*g* arranged radially from a shaft supporting hole 32*a* of the bimetal 5, that is, stress dispersing means, are all formed in the same shape with the same dimensions.

Figure 7A:
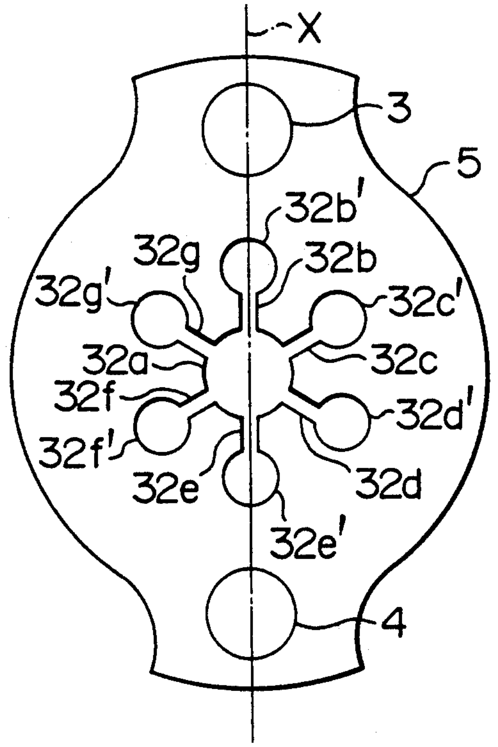
FIG. 7A PRIOR ART
FIGS. 7A and 7B show essential portions of conventional bimetals, respectively.
Figure 7B:
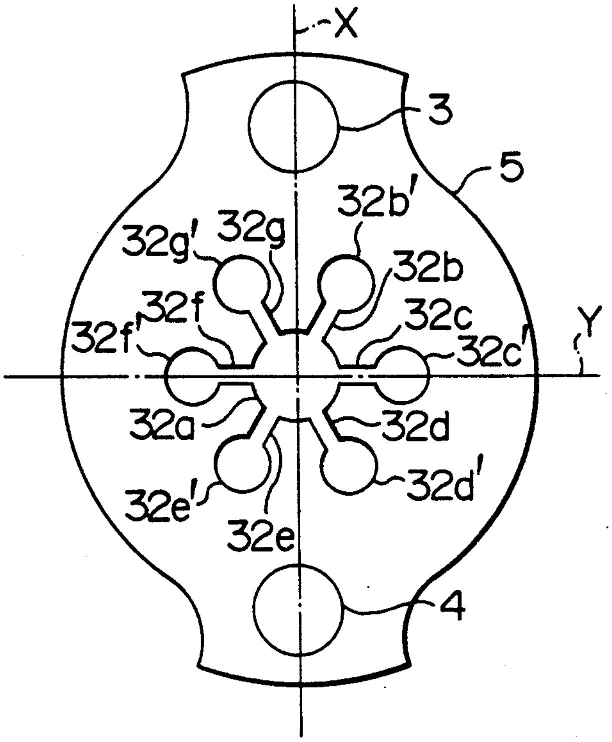
FIG. 7B PRIOR ART

Further, the slits 32*b*, 32*c*, 32*d*, 32*e*, 32*f* and 32*g* are arranged in various ways such that, for example, the slits 32*b* and 32*e* are located on the central line axis X of a pair of movable contacts 3 and 4 as shown in FIG. 7A, and the slits 32*c* and 32*f* are located on the central line axis Y intersecting perpendicularly to the central line axis X of the pair of movable contacts 3 and 4 as shown in FIG. 7B.

Incidentally, the point of maximum stress concentration of the bimetal 5 appears around one of bottom holes 32*b*', 32*c*', 32*d*', 32*e*', 32*f*' and 32*g*' of the respective slits 32*b*, 32*c*, 32*d*, 32*e*, 32*f* and 32*g*.

Consequently, when the lifetime of the bimetal 5 is all gone so that a fatigue rupture is about to start, it is general that the rupture progresses from the point of the greatest stress or from the weakest point of any one of the bottom holes 32*b*, 32*c*, 32*d*, 32*e*, 32*f* and 32*g* toward outwards.

Further, the bimetal 5 and the movable contacts 3, 4 are joined together by resistance welding so that, due to the residual stress at that time and the thermal unbalance of local heating caused by the current flowing concentrically on the resistance weld portion of a very small area in contrast to the surface area of the movable contact 3, 4, a rupture starts from the weld portion of the movable contact 3, 4 toward outwards and inwards of the bimetal 5.

Particularly at the time of making and breaking a large current, this rupture mode occupied nearly all.

Accordingly, when applied to open and close the motor of more than single-phase 100 V-750 W, the means having the slits 32*b* to 32*g* arranged as shown in FIG. 7A or 7B has been used in more many cases.

However, since the shape of rupture of the bimetal 5 was influenced by the positional relationship between the bimetal 5 and the heater 12 serving to heat the bimetal 5, the magnitude of the heating energy of the heater 12, the mounting direction of the overload protective device and the like, it has been impossible to make the shape of rupture uniform.

Figure 8:
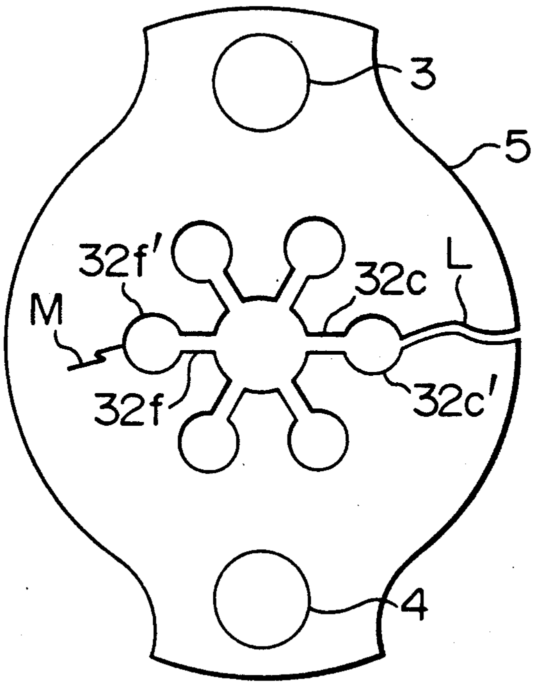
FIG. 8 PRIOR ART
FIG. 8 is a view for explanation of fatigue rupture of the bimetal of FIG. 7B.
Figure 9:
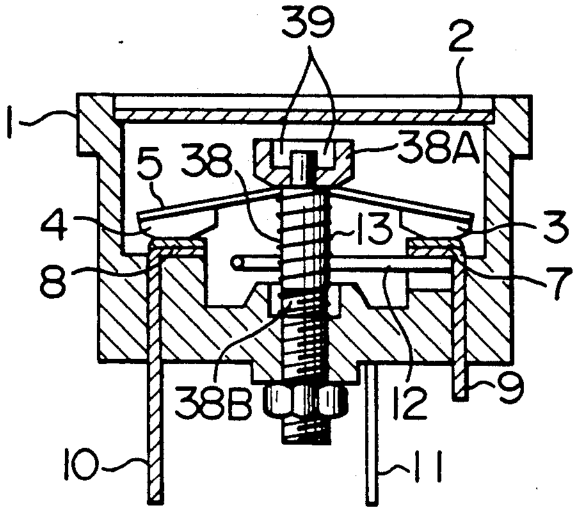
FIG. 9 PRIOR ART
FIG. 9 is an axial sectional view for explaining the operation of the overload protective device of FIG. 6 when the bimetal of FIG. 7B is incorporated therein.

In case that such bimetal 5 is applied to the prior art disclosed in Japanese Utility Model Unexamined Publication No. 64-35642, assuming that a complete rupture L and an incomplete rupture M take place at a time respectively from the slit 32*c* and the slit 32*f* of the bimetal 5 shown in FIG. 8, for example, the thermofusible metal 39 melts to cause the head portion 38A of the adjust screw 38 to separate from the thread portion 38B so that, even if the coil spring 13 serving to hold the bimetal 5 acts to push up the head portion 38A and the bimetal 5, the greater part of the pushing force is consumed as the energy for bending in convex shape starting from the rupture portions described above, resulting in that the welding of the contacts 3, 4 and 7, 8 cannot be released in some cases.

Figure 10:
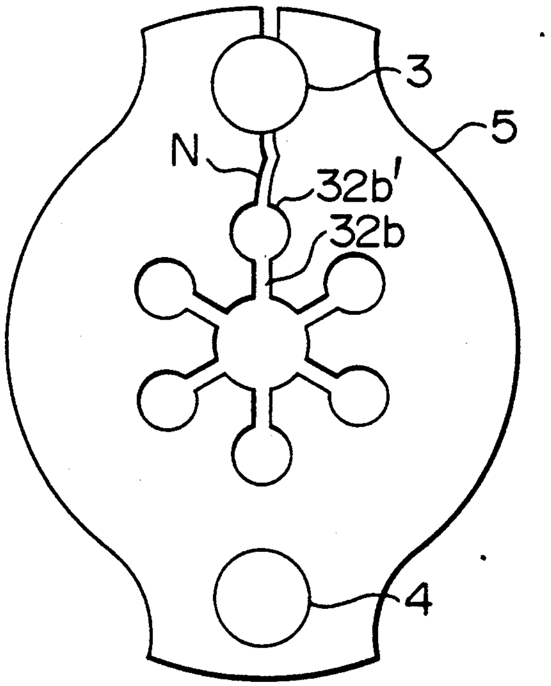
FIG. 10 PRIOR ART
FIG. 10 is a view for explanation of the fatigue rupture of the bimetal of FIG. 7A.
Figure 11:
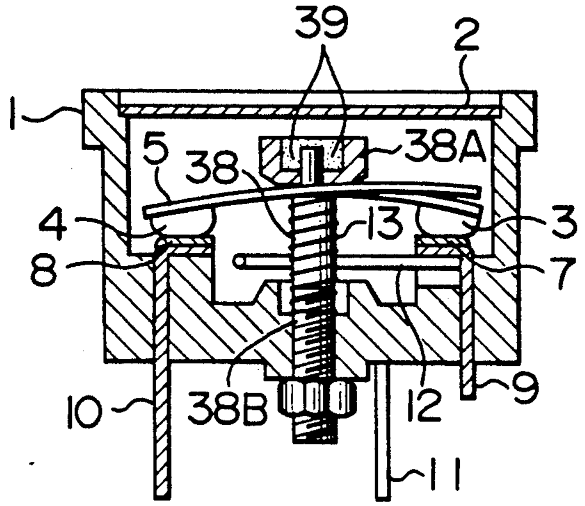
FIG. 11 PRIOR ART
FIG. 11 is an axial sectional view for explaining the operation of the overload protective device of FIG. 6 when the bimetal of FIG. 7A is incorporated therein.

On the other hand, assuming that a complete rupture N takes place and the slit 32*b* of the bimetal 5 shown in FIG. 10 and the ruptured right half comes off the movable contact 3, the thermofusible metal 39 melts to cause the head portion 38A of the adjust screw 38 to separate from the thread portion 38B so that, even if the coil spring 13 serving to hold the bimetal 5 acts to push up the head portion 38A and the bimetal 5, the sectional area of the bimetal 5 round the movable contact 3 is reduced to about 50% or so of the original sectional area thereof as shown in FIG. 11 and part of the pushing force is consumed by deflection of the bimetal 5 to thereby make it impossible to overcome the welding force between the contacts 3, 4 and 7, 8, resulting in the possibility that the essential object cannot be achieved satisfactorily.

An additional embodiment of the present invention is intended to provide a bimetal most suitable for this kind of use which is capable of minimizing the loss of pushing force of the coil spring 13 when the complete rupture takes place in the bimetal 5 as well as transmitting the greater part of the pushing force for the purpose of cancelling the welding force between the contacts 3, 4 and 7, 8.

In the present embodiment, the bimetal 5*c* is formed in the central portion thereof with the shaft supporting hole 32*a* through which the adjust screw 38 is inserted for supporting the bimetal by the shaft portion thereof, and a plurality of slits 32*b*, 32*c*, 32*d*, 32*e*, 32*f* and 32*g* arranged radially from the shaft supporting hole 32*a*. The bottom hole 32*c*' of an arbitrary slit 32*c* which is not located on the central line axis X connecting between the pair of movable contacts 3, 4 and the central line axis Y intersecting perpendicularly to the axis X, is formed with a corner R' smaller than the corner R of the bottom holes 32*b*', 32*d*', 32*e*', 32*e*', 32*f*' and 32*g*' of other slits 32*b*, 32*d*, 32*e*, 32*f* and 32*g* so as to provide a weak point portion (stress concentrating portion).

When an overcurrent flows to a load connected in series, the heater 12 heats the bimetal 5*c*. As the bimetal 5*c* reaches an appointed temperature, the countersunk bimetal 5*c* is inverted to separate rapidly the movable contacts 3, 4 from the fixed contacts 7, 8, thereby cutting out the electric circuit. In case that, while the bimetal 5*c* repeats the make-break operation, if the contacts 3, 4 and 7, 8 are welded together to raise the temperature abnormally, the thermofusible metal 39 by which the head portion 38A of the adjust screw is fixed is caused to melt so that the coil spring 13 acts to push up the head portion 38A of the adjust screw and the bimetal 5 overcoming the contact welding force, thereby cutting out the electric circuit. The coil spring 13 has a sufficient free length lest the head portion 38A and the bimetal 5 should come in contact again with the various portions to close the electric circuit after cooling down. Further, the adjust screw 38 is prepared by inserting the protrusion of the thread portion 38B into the hole of the head portion 38A and then bonding them together by the thermo-fusible metal 39.

In the overload protective device described above, while the bimetal 5c repeats the inversion motion, the portion of the corner R' where the stress is the largest suffers a crack first and foremost. Then, the crack reaches at last the outer periphery of the bimetal 5c, resulting in that the counter-sunk bimetal 5c is partially separated. In this state, if it is continued to make and break the load, the contacts 3, 4 and 7, 8 are made to weld together due to reduction of the contact pressure.

However, since the place where the rupture takes place is not located on the X axis and Y axis as mentioned above, reduction of the contact pressure is less in comparison with the case that the rupture takes place at random and, hence, the contact welding force depending on the magnitude of the contact pressure is estimated at a value exceeding slightly the inversion force of the bimetal since the unstable contact time (referred to as chatter or bouncing as well) corresponding to the contact transient phenomenon of the contacts 3, 4 and 7, 8 is short so that the arc generating energy is cut small correspondingly. (Every experiment resulted in that the contact welding was cancelled with a coil spring of the spring load of 325 g.)

The present inventors have already confirmed the effects of this embodiment by conducting a comparative test on the devices of the prior art and present invention with the load to be opened and closed varying.

TABLE 5

| Kind of load | Load current | Spring load | Circuit breaking percentage (Contact welding cancelling percentage) Prior art | Present invention |
|---|---|---|---|---|
| Motor for single phase 100 V-100 W | 6-11.5 A | 325 g | 100% (5/5) | — |
| Motor for single phase 100 V-150 W | 22-30.5 A | 325 g | 100% (5/5) | — |
| Motor for single phase 100 V-250 W | 26-33.5 A | 325 g | 80% (4/5) | 100% (5/5) |
| Motor for single phase 100 V-750 W | 38-43.5 A | 325 g | 40% (2/5) | 100% (5/5) |

Although the above-described embodiment uses the bimetal 5c of the type that the slits 32b and 32e are overlapped on the X axis, the same effect can be achieved as well by a bimetal 5d of the type that the slits 32b and 32e are overlapped on the Y axis as shown in FIG. 23B.

Figure 26A:
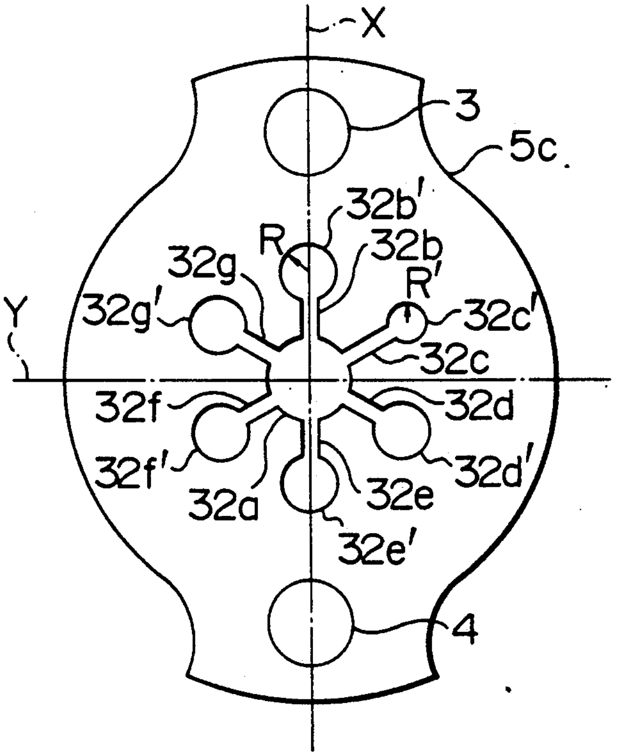
FIGS. 26A, 26B, 26C and 26D are plan views of various examples of the bimetal used in the fifth embodiment of the invention.
Figure 26B:
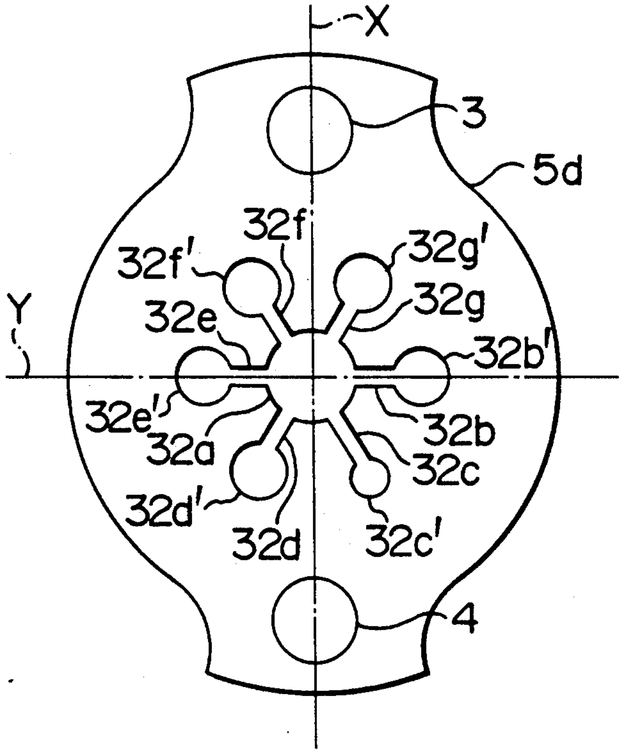
Figure 26C:
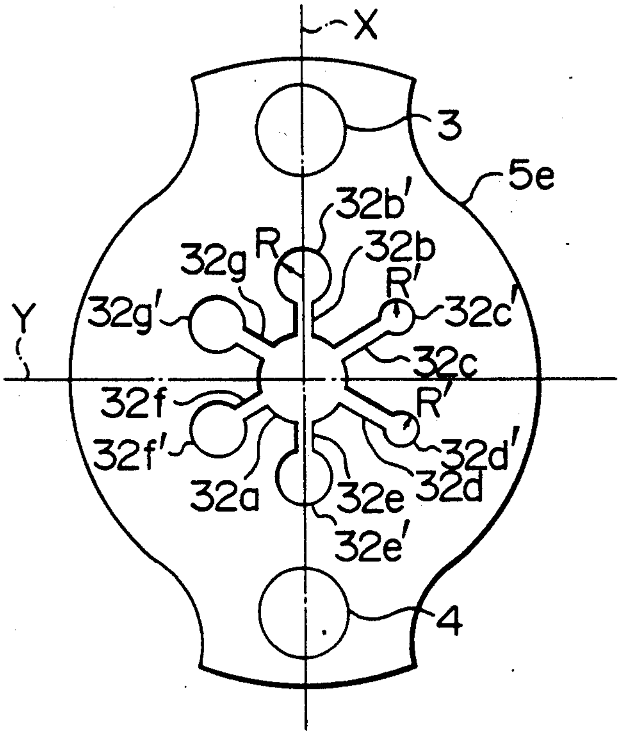

In connection with FIGS. 26A and 26B, description was given of the case that the slit where the magnitude of stress becomes largest is only one. However, as seen in a bimetal 5e shown in FIG. 26C, two slits 32c and 32d located on one side of the bimetal parallel to the X axis can be formed with the portions of Corner R'. This makes it possible to leave the other side symmetrical to the above one side in a complete form, thereby preventing the diagonal rupture which is a fatal blow so as to ensure the operation stability much more.

Figure 26D:
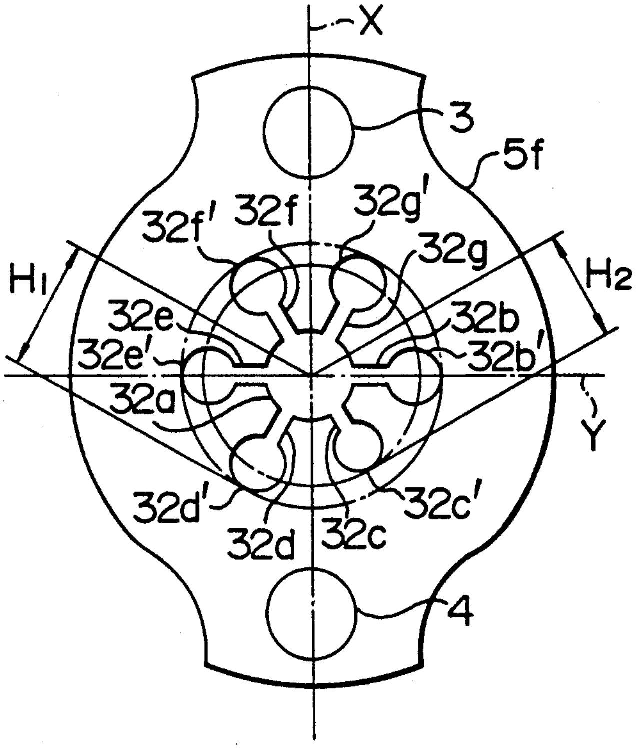

In addition, if a depth $H_2$ of the slit 32c down to the bottom hole 32c' is smaller than a depth $H_1$ of other slits 32b and 32d to 32g down to the bottom holes 32b' and 32d' to 32g', respectively, as seen in a bimetal 5f shown in FIG. 26D, it is of course possible to obtain the same effect as described before.

In other words, any arbitrary means is available so far as it can provide a maximum stress portion. For example, the present invention also includes a bimetal 5g shown in FIG. 27 in which a notch portion 32h serving as the stress concentrating portion is formed in the outer peripheral portion of the bimetal, on the Z axis corresponding to the extension of the slit 32c. In this kind of bimetal formed with the notch in the outer peripheral portion, on the extension of the slit, a crack on the outer peripheral portion side and another crack on the bottom hole side are made to progress simultaneously due to notch effect so as to be linked with each other, thus making it possible to obtain the same effect as described before.

Particularly, starting of the crack from the outer peripheral portion shows the effect of catching early an abnormal current flow under which the overload protective device is actuated, that is, a state in which the motor is locked and incapable of operating under normal conditions, so as to stop the function in safety. The above-described stress concentrating portion is not limited to the outer peripheral portion but may be formed anywhere so far as it is located on the extension of the slit, that is, between the slit and the outer peripheral portion.

Figure 27:
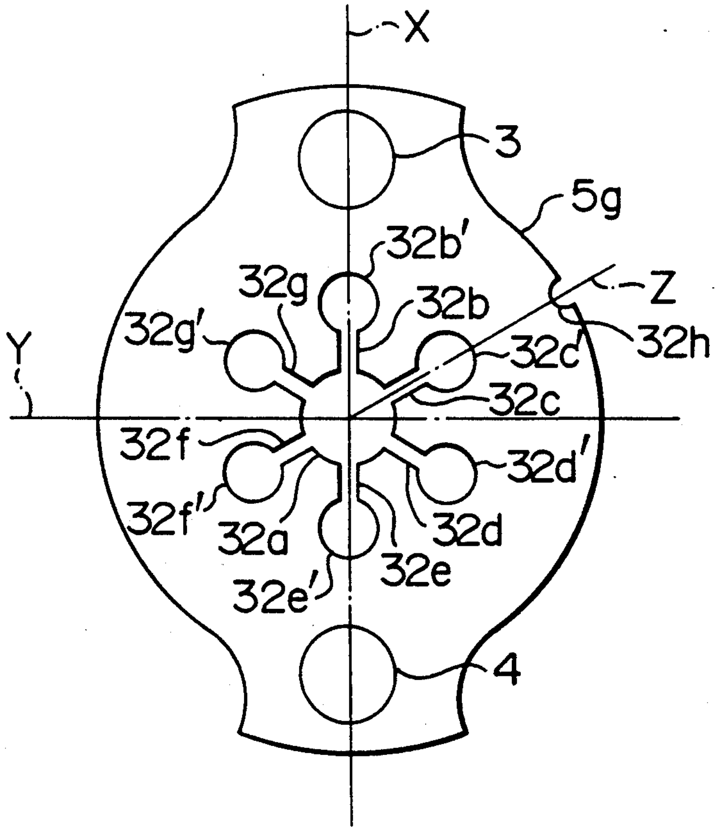
FIG. 27 is a plan view of still another example of the bimetal used in the fifth embodiment of the invention.

Further, it is possible to use the bimetal shown in FIG. 27 together with the bimetals shown in FIGS. 26A to 26D, and various combinations are applicable to the present invention.

Namely, it is possible to form the stress concentrating portion anywhere other than the location where the rupture must be prevented from taking place.

According to this embodiment, it is possible to cope with loads ranging from a small current one to a large current one using the same bimetal.

Further, this effect can be achieved only by forming a weak point portion (stress concentrating portion) in a portion of or around the circumference of the slits arranged radially from the shaft supporting hole for serving to disperse the stress applied to the bimetal, and therefore, not only the manufacture is facilitated but also the cost does not rise and the attaching of the bimetal is not restricted, as well as the bimetal is interchangeable since it has the same external dimensions as the conventional ones, resulting in that it is easy to put into practice. In addition, in the embodiment described above, the bimetal has been described as being formed with six slits, and however, the number of slits can be arbitrarily selected.

What is claimed is:

1. An overload protective device to be disposed in an electric circuit serving to supply current to a load, said device comprising:

a case;

a pair of fixed terminals each having a fixed contact inside of said case;

a shaft extending in said case with one end thereof fixed to said case and the other end thereof constituting a free end formed with a head portion of a diameter greater than that of said shaft;

an inversible disk-like bimetal of curved shape having formed in a central portion thereof a hole through which said shaft extends and movable contacts capable of coming in contact with said fixed contacts respectively; and elastic means serving to resiliently bias said bimetal toward said head portion, wherein a thermoactive disk member of a curved shape is disposed between said head portion and said bimetal and movable in response to heat from a first position where said thermoactive member is in contact with said head portion at a peripheral edge portion of said thermoactive member with a central portion thereof projecting against said bimetal to urge said bimetal against a force of said elastic means, to a second position where the central portion of said thermoactive member projects against said head portion to release at least a part of a force of said elastic means, thereby breaking said electric circuit permanently.

2. An overload protective device according to claim 1, wherein the central portion of said head portion has a concave surface portion adjacent to said thermoactive member.

3. An overload protective device according to claim 1, wherein said head portion is formed therein with a plurality of through-holes.

4. An overload protective device according to claim 1, wherein a washer is disposed between said thermoactive member and said bimetal.

5. An overload protective device according to claim 1, wherein said thermoactive member comprises a bimetal.

6. An overload protective device according to claim 1, wherein said thermoactive member comprises a shape memory alloy plate having memorized therein a flat shape in a high temperature range.

7. An overload protective device according to claim 6, wherein said shape memory alloy plate is made of a unidirectional material having an non-reversible shape memory effect.

8. An overload protective device according to claim 1, wherein the temperature to which said thermo-active member is responsive to move is higher than an inversion point of said bimetal by a range of from 10° C. to 100° C.

9. An overload protective device according to claim 1, wherein said thermoactive member is made of a bimetal having a recovery temperature which is not higher than −10° C.

10. An overload protective device to be disposed in an electric circuit serving to supply current to a load, said device comprising:

a case, a pair of fixed terminals each having a fixed contact inside of said case;

a shaft extending in said case with one end thereof fixed to said case and the other end thereof constituting a free end formed with a head portion of a diameter greater than that of said shaft;

an inversible disk-like bimetal of a curved shape having formed in a central portion thereof a hole through which said shaft extends and movable contacts capable of coming in contact with said fixed contacts respectively; and elastic means serving to resiliently bias said bimetal toward said head portion, wherein a coiled shape memory alloy member having memorized therein a close-contracted state in a high temperature range and a washer are disposed between said head portion and said bimetal, said washer being disposed between said bimetal and one end of said coiled shape memory alloy member, and said coiled shape memory alloy member being in contact at the other end thereof with said head portion.

11. An overload protective device according to claim 10, wherein temperation of temperature of said coiled shape memory alloy member has a transformation temperature higher than an inversion temperature of said bimetal by a range of from 10° C. to 100° C.

12. An overload protective device according to claim 10, wherein said coiled shape memory alloy member is made of a unidirectional material having a non-reversible shape memory effect.

13. An overload protective device to be disposed in an electric circuit serving to supply current to a load, said device comprising;

a case;

a pair of fixed terminals each having a fixed contact inside of said case;

a shaft extending in said case with one end thereof fixed to said case and the other end thereof constituting a free end formed with a head portion of a diameter greater than that of said shaft;

a first inversible disk-like bimetal of a curved shape having formed in a central portion thereof a hole through which said shaft extends and movable contacts capable of coming in contact with said fixed contacts respectively; and elastic means serving to resiliently bias said bimetal toward said head portion, wherein a second bimetal and a washer are disposed between said head portion and said first bimetal, said second bimetal being a disk-like bimetal movable in response to heat from a first position where it is curved in the same direction as said first bimetal in its non-inverted position to a second position where said second bimetal is inverted in the reverse direction, and said washer comprises a disk washer curved in the opposite direction to said first bimetal in its non-inverted position and having a peripheral edge disposed in contact with the surface of said second bimetal and a central portion disposed in contact with said first bimetal.

14. An overload protective device to be disposed in an electric circuit serving to supply current to a motor, said device comprising:

a case;

a pair of fixed terminals each having a fixed contact inside of said case;

a shaft extending in said case with one end thereof fixed to said case and the other end thereof constituting a free end formed with a head portion of a diameter greater than that of said shaft;

an inversible disk-like bimetal of a curved shape having formed in a central portion thereof a hole through which said shaft extends and movable contacts capable of coming in contact with said fixed contacts respectively; and heating means electrically connected in series to said bimetal and disposed in said case in a position where said heating means is capable of heating said bimetal, said heating means comprising a material which is meltable within two seconds by a current of an ampere 1.35 to 1.85 times a rated starting ampere of said motor.

15. An overload protective device according to claim 14, wherein said heating means is made of a material selected from a group including copper wire, wire, nickelchromium wire, ferrochromium wire and copper alloy wire.

16. An overload protective device to be disposed in an electric circuit serving to supply current to a load, said device comprising:

a case;

a pair of fixed terminals each having a fixed contact inside of said case;

a shaft extending in said case with one end thereof fixed to said case;

a head portion welded to the other end of said shaft with a thermofusible metal and having a diameter greater than that of said shaft;

an inversible disk-like bimetal of a curved shape having formed in a central portion thereof a hole through which said shaft extends and movable contacts capable of coming in contact with said fixed contacts respectively; and elastic means serving to resiliently bias said bimetal toward said head portion, wherein said bimetal has a plurality of slits extending radially from said central hole and a stress concentrating portion disposed in at least one of positions located in a part of said plurality of slits and located on the extension of a part of said plurality of slits, and wherein said stress concentrating portion is disposed in a position offset from a first center line connecting a pair of said movable contacts and also from a second center line perpendicular to said first center line.

17. An overload protective device according to claim 16, wherein each of said plurality of slits terminates in a bottom hole formed at the radially outward end thereof, the diameter of one of the bottom holes being smaller than those of other bottom holes.

18. An overload protective device according to claim 16, wherein each of said plurality of slits terminates in a bottom hole formed at the radially outward end thereof, the diameters of two bottom holes being smaller than those of other bottom holes.

19. An overload protective device according to claim 16, wherein said plurality of slits terminate in bottom holes formed at the radially outward ends thereof and arranged such that one of the bottom holes is spaced from said central hole at a distance less than that between each of the other bottom holes and said central hole.

20. An overload protective device according to claim 16, wherein said plurality of slits terminate in bottom holes formed at the radially outward ends and arranged such that two bottom holes are each spaced from said central hole at a distance less than that between each of the other bottom holes and said central hole.

21. An overload protective device according to claim 16, wherein a notch is formed in the outer periphery of said bimetal and disposed on an extension of a longitudinal axis one of said plurality of slits.

22. An overload protective device according to claim 16, wherein notches are formed in the outer peripheral portion of said bimetal and disposed on extensions of longitudinal axes two slits of said plurality of slits.

* * * * *